(12) United States Patent
Hatch et al.

(10) Patent No.: US 11,079,822 B2
(45) Date of Patent: Aug. 3, 2021

(54) INTEGRATED POWER AND THERMAL MANAGEMENT IN NON-VOLATILE MEMORY

(71) Applicant: Western Digital Technologies, Inc., San Jose, CA (US)

(72) Inventors: Mark Hatch, Murray, UT (US); Reed Tidwell, Centerville, UT (US); David Wagner, Rochester, MN (US); Mark Hardiman, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 109 days.

(21) Appl. No.: 16/457,277

(22) Filed: Jun. 28, 2019

(65) Prior Publication Data

US 2020/0409441 A1 Dec. 31, 2020

(51) Int. Cl.
| | |
|---|---|
| *G06F 1/26* | (2006.01) |
| *G06F 1/20* | (2006.01) |
| *G06F 1/324* | (2019.01) |
| *G06F 3/06* | (2006.01) |
| *G06F 1/3234* | (2019.01) |

(52) U.S. Cl.
CPC .............. *G06F 1/266* (2013.01); *G06F 1/206* (2013.01); *G06F 1/324* (2013.01); *G06F 1/3268* (2013.01); *G06F 3/0625* (2013.01); *G06F 3/0653* (2013.01); *G06F 3/0679* (2013.01)

(58) Field of Classification Search
CPC .......... G06F 1/266; G06F 1/206; G06F 1/324; G06F 1/3268; G06F 3/0625; G06F 3/0653; G06F 3/0679

See application file for complete search history.

(56) References Cited

U.S. PATENT DOCUMENTS

| | | | |
|---|---|---|---|
| 7,064,994 B1 | 6/2006 | Wu | |
| 7,478,260 B2 * | 1/2009 | Spencer | G06F 1/04 713/320 |
| 7,919,952 B1 * | 4/2011 | Fahrenbruch | H02M 3/156 323/222 |
| 8,248,000 B2 * | 8/2012 | Liu | H05B 45/3725 315/307 |
| 9,323,304 B2 | 4/2016 | Salessi et al. | |

(Continued)

OTHER PUBLICATIONS

International Search Report & the Written Opinion of the International Searching Authority dated Apr. 2, 2020, International Application No. PCT/US2019/066424.

(Continued)

*Primary Examiner* — Vincent H Tran
(74) *Attorney, Agent, or Firm* — Vierra Magen Marcus LLP

(57) ABSTRACT

A non-volatile storage device comprises non-volatile memory cells, clocked circuity, and one or more control circuits. The one or more control circuits are configured to process commands to access the non-volatile memory cells using the clocked circuity, implement a power control loop to regulate power consumption of the non-volatile storage device based on a first feedback signal, implement a temperature control loop to regulate temperature of the non-volatile storage device based on a second feedback signal, and implement a clock frequency control loop to regulate one or more clock frequencies of the clocked circuitry based on a third feedback signal.

19 Claims, 18 Drawing Sheets

(56) References Cited

U.S. PATENT DOCUMENTS

| | | | |
|---|---|---|---|
| 9,678,558 B2 | 6/2017 | Erez | |
| 9,746,383 B2* | 8/2017 | Hsu | G11C 7/04 |
| 9,760,311 B1 | 9/2017 | Amir et al. | |
| 9,946,481 B2 | 4/2018 | Warriner | |
| 10,025,522 B2 | 7/2018 | Helmick | |
| 10,831,384 B2* | 11/2020 | Myers | G06F 3/0625 |
| 2005/0071550 A1* | 3/2005 | Lowe | G06F 3/0673 |
| | | | 711/113 |
| 2005/0246558 A1* | 11/2005 | Ku | G06F 1/206 |
| | | | 713/300 |
| 2008/0307184 A1* | 12/2008 | Barnum | G06F 13/1689 |
| | | | 711/167 |
| 2009/0039968 A1* | 2/2009 | Thomsen | H03L 7/1976 |
| | | | 331/10 |
| 2010/0332871 A1* | 12/2010 | Allalouf | G06F 9/5094 |
| | | | 713/320 |
| 2012/0005514 A1 | 1/2012 | Henry et al. | |
| 2012/0066439 A1* | 3/2012 | Fillingim | G06F 11/3433 |
| | | | 711/103 |
| 2013/0275781 A1 | 10/2013 | Ramage et al. | |
| 2014/0372693 A1* | 12/2014 | Yochai | G06F 12/0868 |
| | | | 711/113 |
| 2017/0288421 A1* | 10/2017 | Greening | H02J 7/00041 |
| 2018/0074743 A1* | 3/2018 | Jeter | G06F 3/0683 |
| 2018/0182452 A1 | 6/2018 | Lee | |
| 2018/0335977 A1 | 11/2018 | Tidwell et al. | |
| 2018/0335978 A1 | 11/2018 | Tidwell et al. | |
| 2019/0065086 A1* | 2/2019 | Margetts | G06F 3/0659 |
| 2019/0094938 A1* | 3/2019 | Tidwell | G06F 1/329 |
| 2019/0303039 A1* | 10/2019 | Teh | G06F 13/1642 |
| 2020/0278808 A1* | 9/2020 | Zhu | G06F 3/0679 |
| 2020/0287413 A1* | 9/2020 | Peretz | H02J 50/05 |

OTHER PUBLICATIONS

Xilinx, "LogiCORE IP Asynchronous Sample Rate Converter v.2.0: Product Guide fo Vivado Design Suite," Oct. 2, 2013, 59 pages.

* cited by examiner

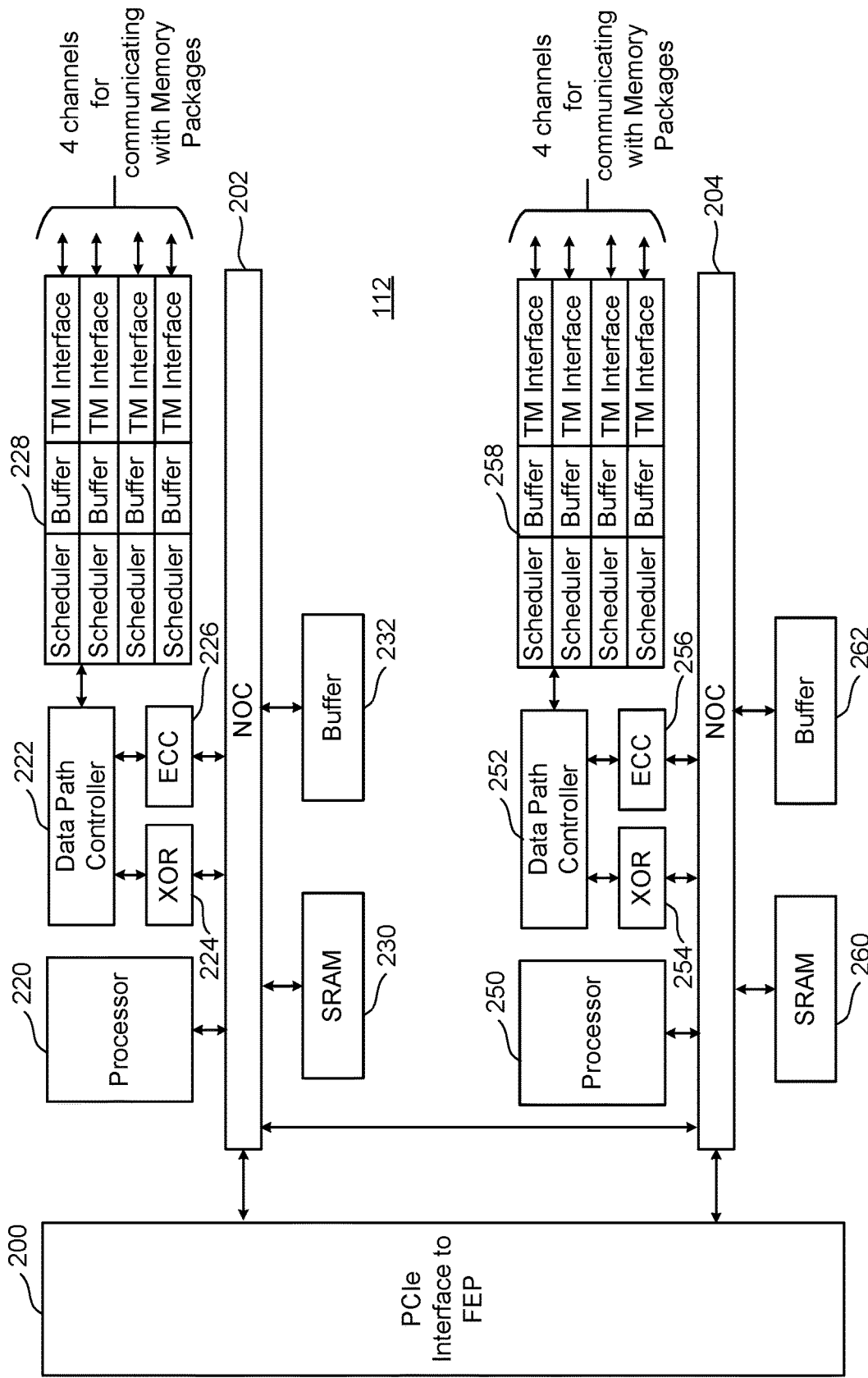

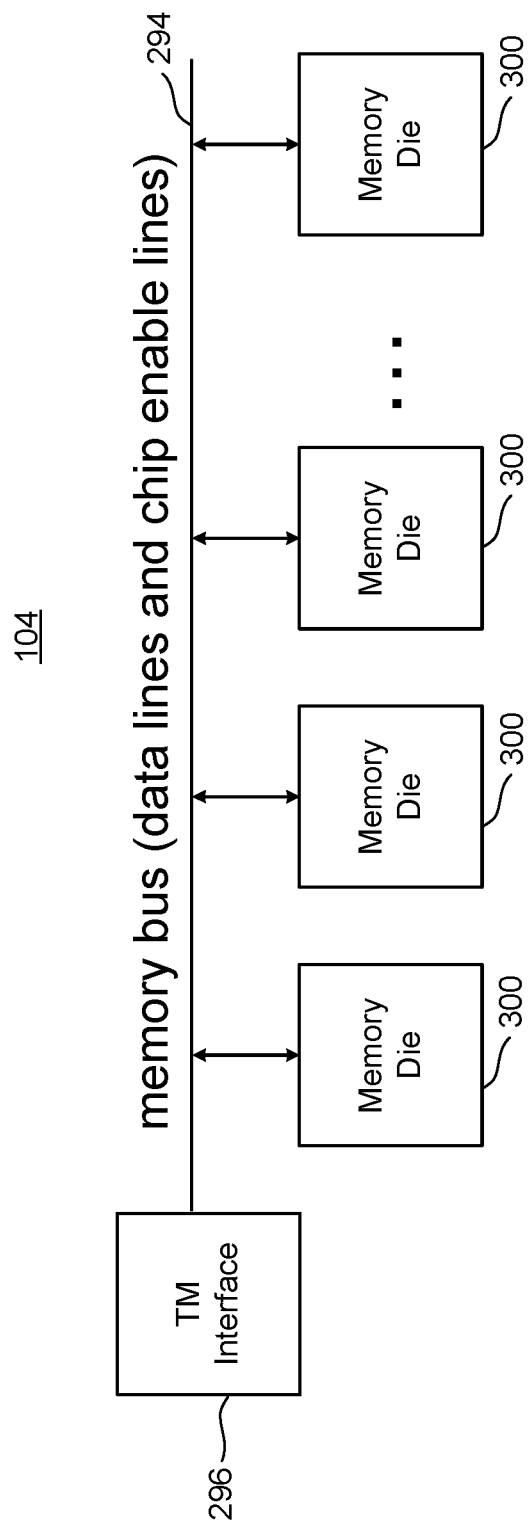

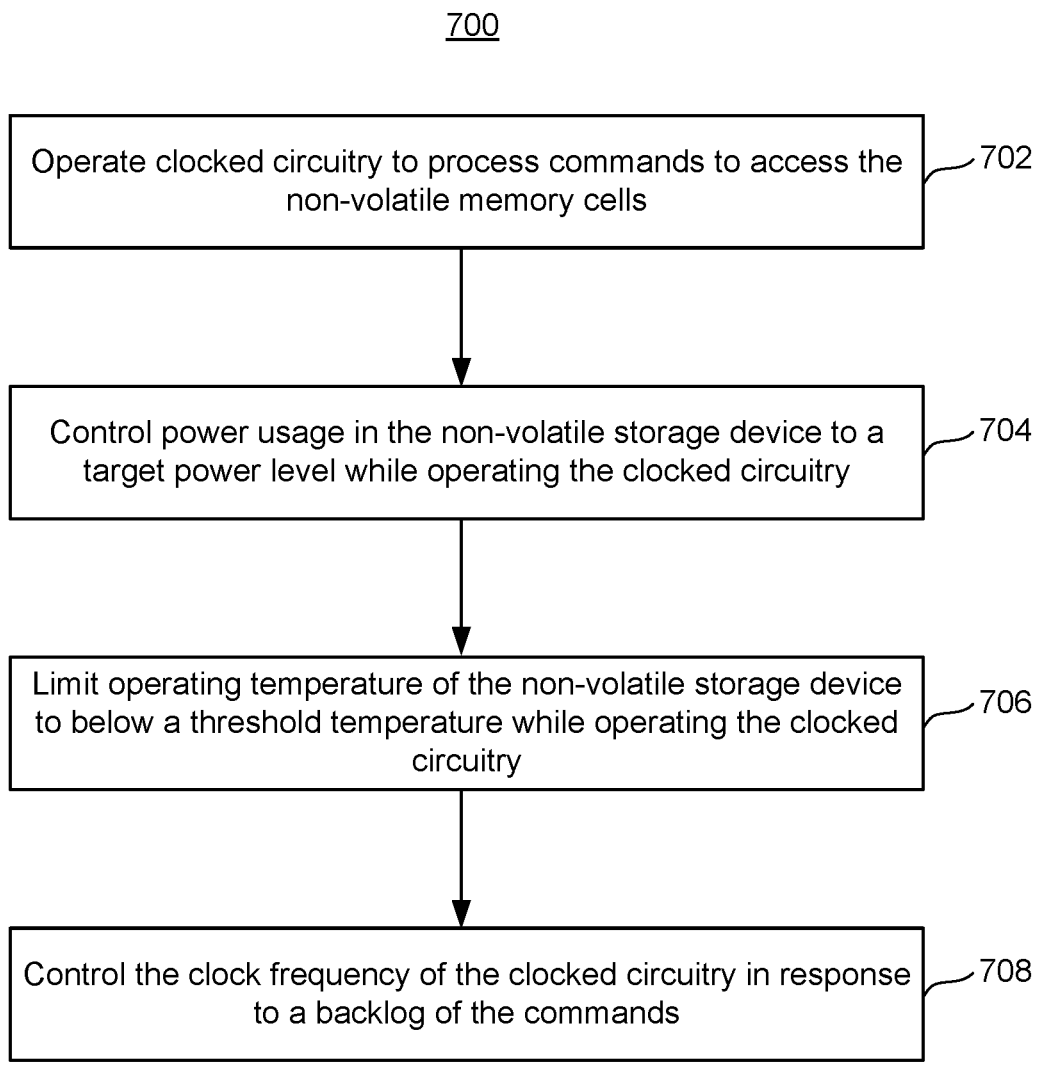

| Control Type | Power | Temperature | DFS |
|---|---|---|---|
| Measurement input | System Power | Composite Temp. | Command Backlog |
| Control output | Power Credits | Power State | Clock Frequencies |
| Parameter List | | | |
| Open/Closed loop | Open/Closed | Closed loop | Open/Closed |
| Control limit max | From Power State Table | User-Specified Power State | FE, BE Max Clock Frequencies |
| Control limit min | Minimum power credits | Lowest Power Operational Power State | FE, BE Min Clock Frequencies |
| Target | % relative to Max Power (MP) | Degrees C | Backlog units |
| Zone 1 high threshold | % relative to MP | Degrees C | Backlog units |
| Zone 1 low threshold | % relative to MP | Degrees C | Backlog units |
| Zone 1 up correction (0 = disable) | Credits (mW) | Power State Steps | % rel. to nominal |
| Zone 1 down correction (0 = disable) | Credits (mW) | Power State Steps | % rel. to nominal |
| Zone 1 ETA factor (0 = disable) | Update periods | Update periods | Update periods |

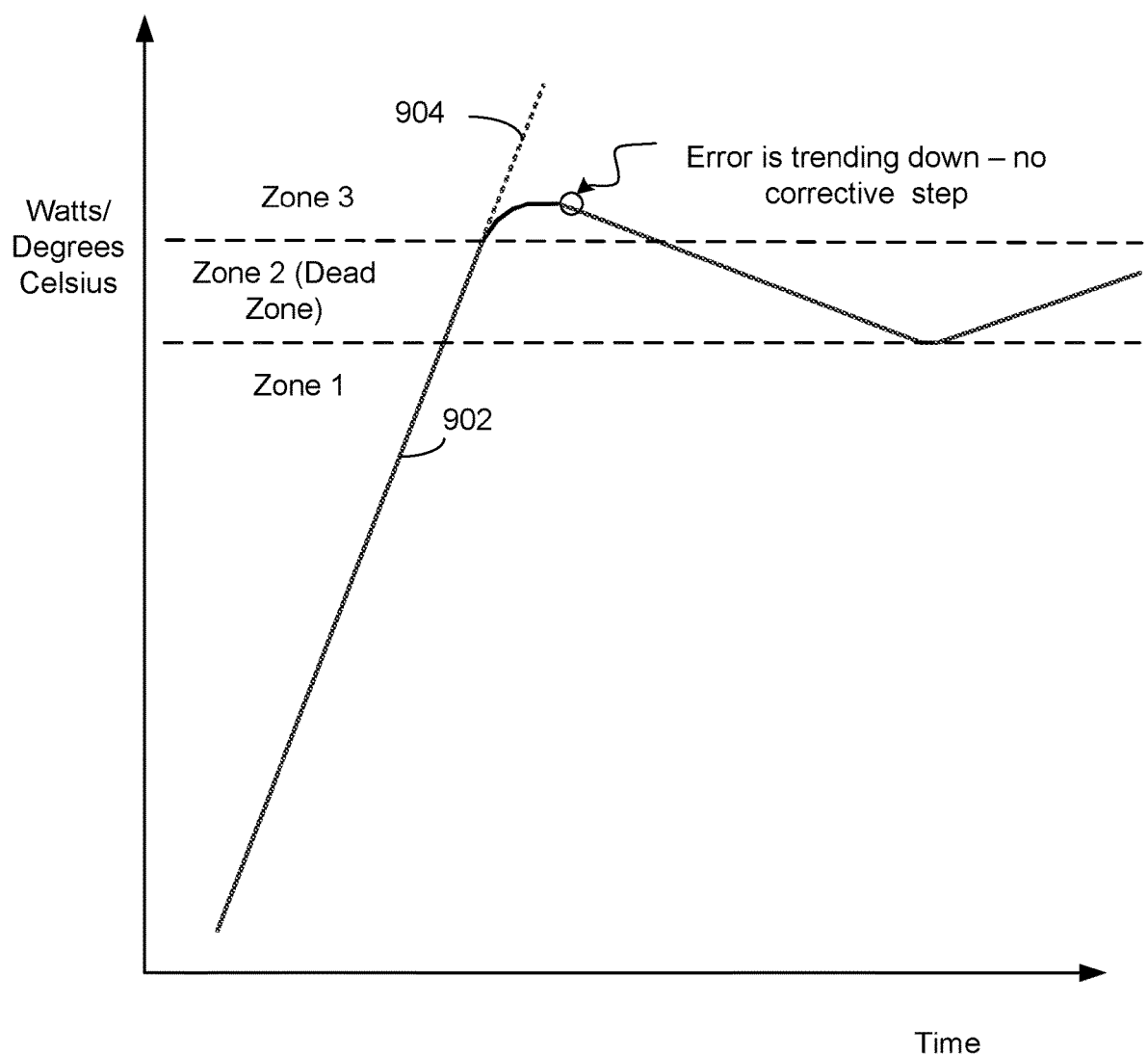

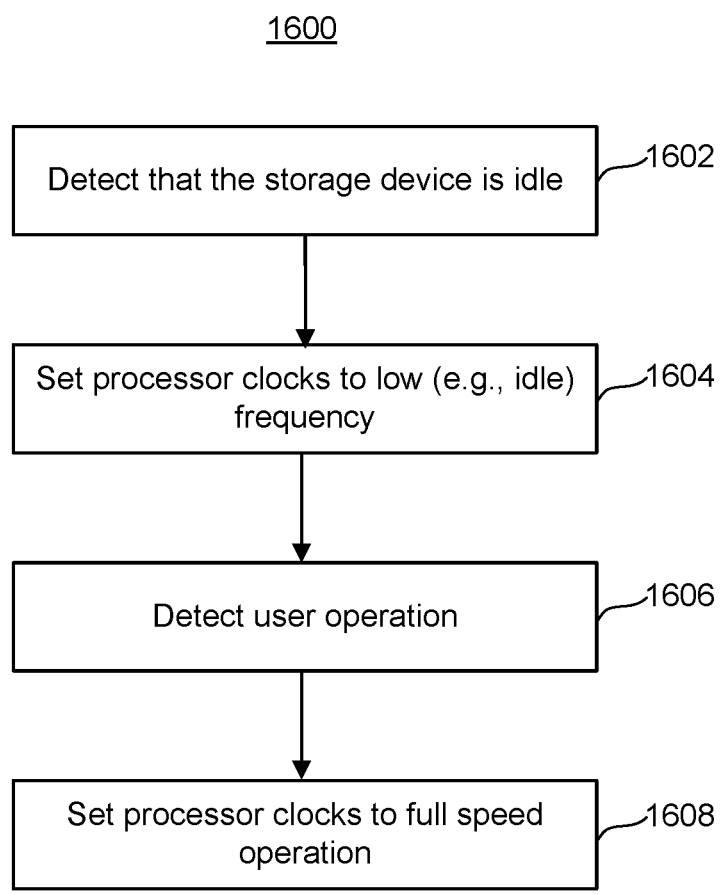

INTEGRATED POWER AND THERMAL MANAGEMENT IN NON-VOLATILE MEMORY

BACKGROUND

Semiconductor memory is widely used in various electronic devices such as cellular telephones, digital cameras, personal digital assistants, medical electronics, mobile computing devices, non-mobile computing devices and data servers. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), and others. One example of a non-volatile storage device that uses semiconductor based non-volatile memory is a solid state drive (SSD).

Non-volatile storage devices are subject to rapid changes in both power usage and operating temperature. Power usage can be very volatile due to the power profile of memory operations, and variability in workloads. Conventional power and thermal management often have goals which conflict. For example, goals of strict enforcement of limits, fast reaction, and maximizing performance often conflict with each other. Thus, it is difficult to design a storage device that meets one power and thermal management goal without sacrificing another goal.

BRIEF DESCRIPTION OF THE DRAWINGS

Like-numbered elements refer to common components in the different Figures.

FIG. 1C is a block diagram of one embodiment of a Back End Processor Circuit. In some embodiments, the Back End Processor Circuit is part of a Controller.

FIG. 1D is a block diagram of one embodiment of a memory package.

FIG. 7 is a flowchart of one embodiment of a process of operating a non-volatile storage device.

FIG. 8 depicts one embodiment of a parameter table.

FIG. 9 is a diagram that illustrates an embodiment of correction steps based on an error trend.

FIG. 16 is flowchart of one embodiment of a process of saving power during idle periods in a non-volatile storage device.

DETAILED DESCRIPTION

Techniques are disclosed herein for power and thermal management in non-volatile storage devices. In some embodiments, the storage device has three integrated control loops. A power control loop is used to regulate power consumption of the storage devices, a thermal control loop is used to regulate operating temperature of the storage devices, and a dynamic frequency scaling (DFS) control loop is used to control clock frequencies of one or more processors in the storage devices, in one embodiment. The use of these three control loops allows for very effective power and thermal management. For example, storage devices performance can be increased without an increase in total power usage.

Figure 1A:
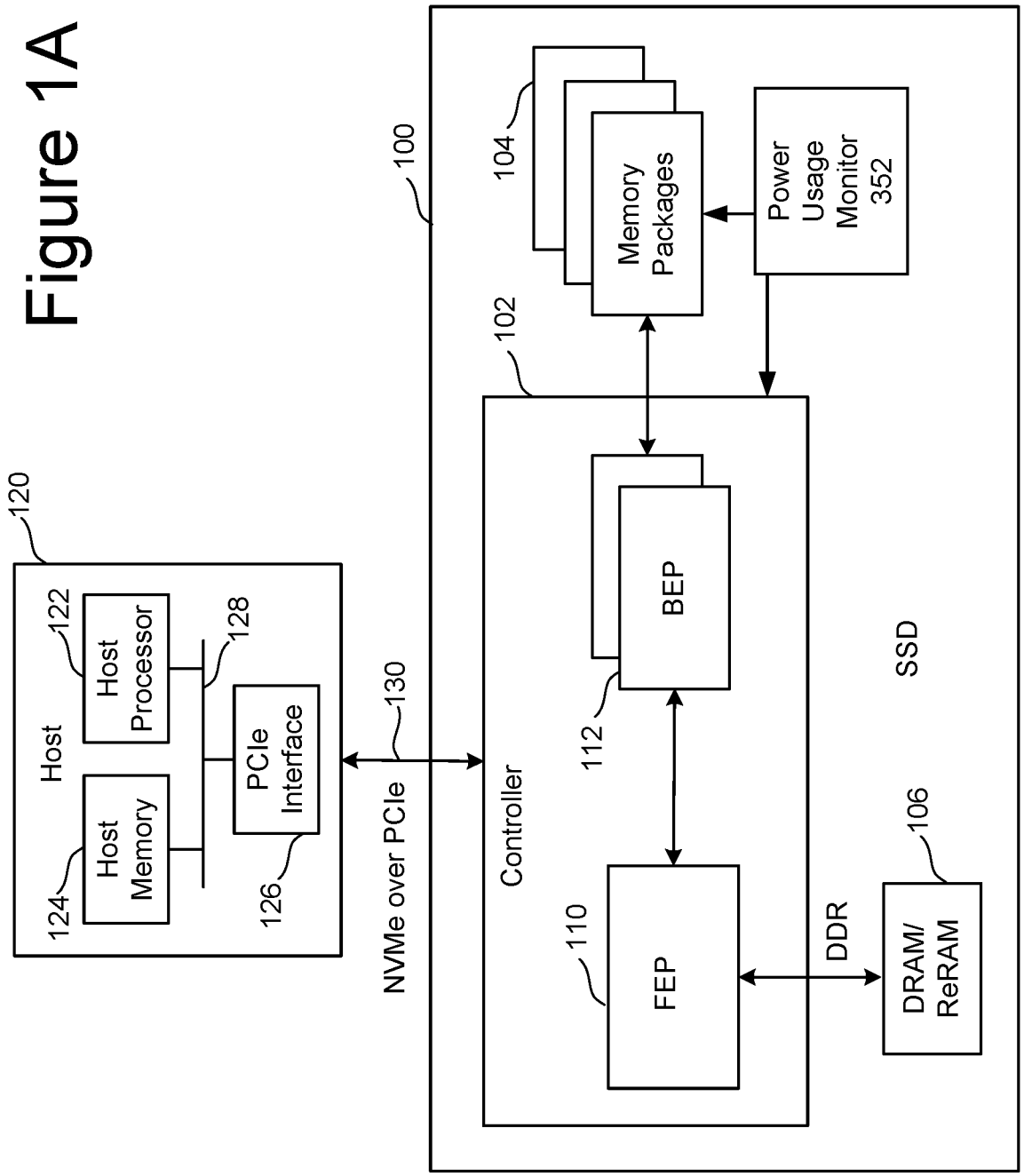
FIG. 1A is a block diagram of one embodiment of a storage device connected to a host.

FIG. 1A is a block diagram of one embodiment of a storage device 100 connected to a host 120. Storage device 100 can implement the technology proposed herein. Many different types of storage or memory devices can be used with the technology proposed herein. One example storage device is a solid state drive (SSD); however, other types of storage and memory devices can also be used. Storage device 100 comprises a Controller 102, non-volatile memory 104 for storing data, and local memory (e.g. DRAM/ReRAM) 106. Controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip (SoC). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage device). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with storage device 100, host 120 includes a host processor 122, host memory 124, and a PCIe interface 126 connected to bus 128. Host memory 124 is the host's physical memory, and can be DRAM, SRAM, non-volatile memory or another type of storage. Host 120 is external to and separate from storage device 100. In one embodiment, storage device 100 is embedded in host 120.

The power usage monitor 352 is configured to monitor the power consumption of the storage device 100. For example, the power usage monitor 352 may include sensors and circuitry (e.g., one or more current sensors and/or voltage sensors) configured to measure power consumption of different components of the storage device 100. In some embodiments, when the power consumption of the storage device 100 is above a threshold, limit, or power budget, the storage device 100 may perform power management operations to reduce or limit power consumption. In some power management scenarios, the performance of some components (e.g., the memory packages 104) may be reduced, limited, or throttled. The data storage device 100 may include components and circuitry configured to perform power management functions. Power throttling refers to operations, for example, frequency and/or voltage reduction, that can reduce the power consumption of the throttled circuitry or components.

Figure 1B:
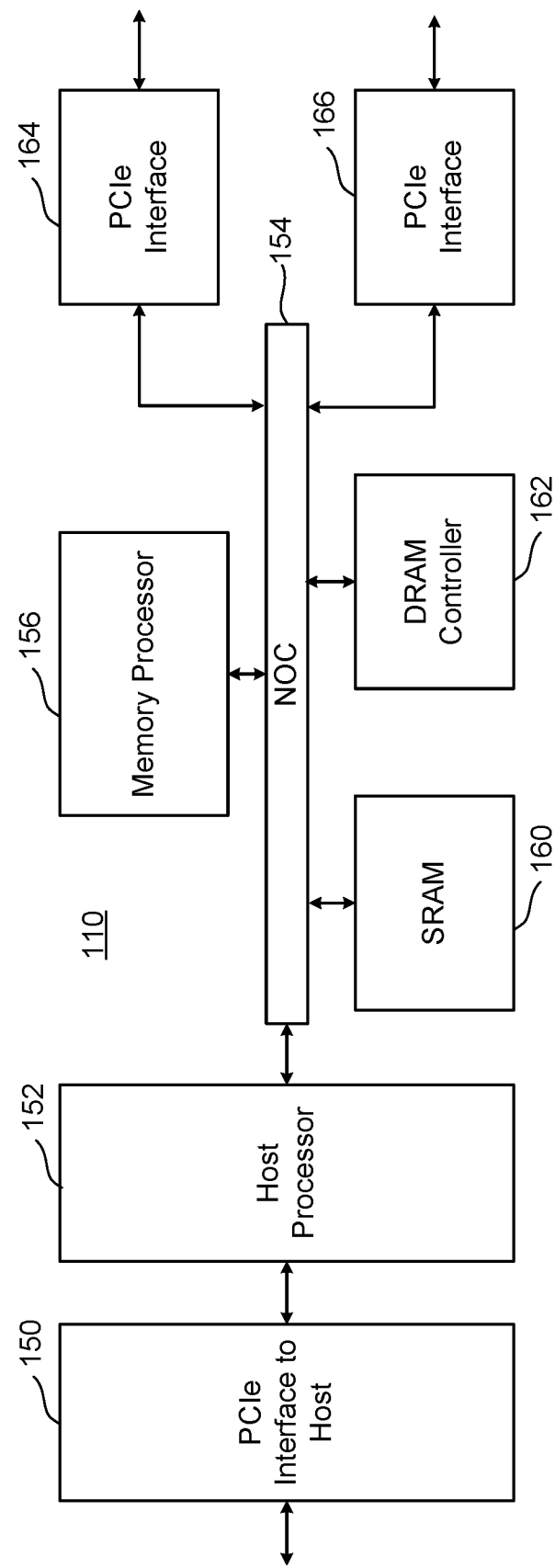
FIG. 1B is a block diagram of one embodiment of a Front End Processor Circuit. In some embodiments, the Front End Processor Circuit is part of a Controller.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, the SSD controller will include two BEP circuits 112; therefore there are two PCIe Interfaces 164/166. Each PCIe Interface communicates with one of the BEP circuits 112. In other embodiments, there can be more or less than two BEP circuits 112; therefore, there can be more than two PCIe Interfaces.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

FIG. 1D is a block diagram of one embodiment of a memory package 104 that includes a plurality of memory die 300 connected to a memory bus (data lines and chip enable lines) 294. The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2:
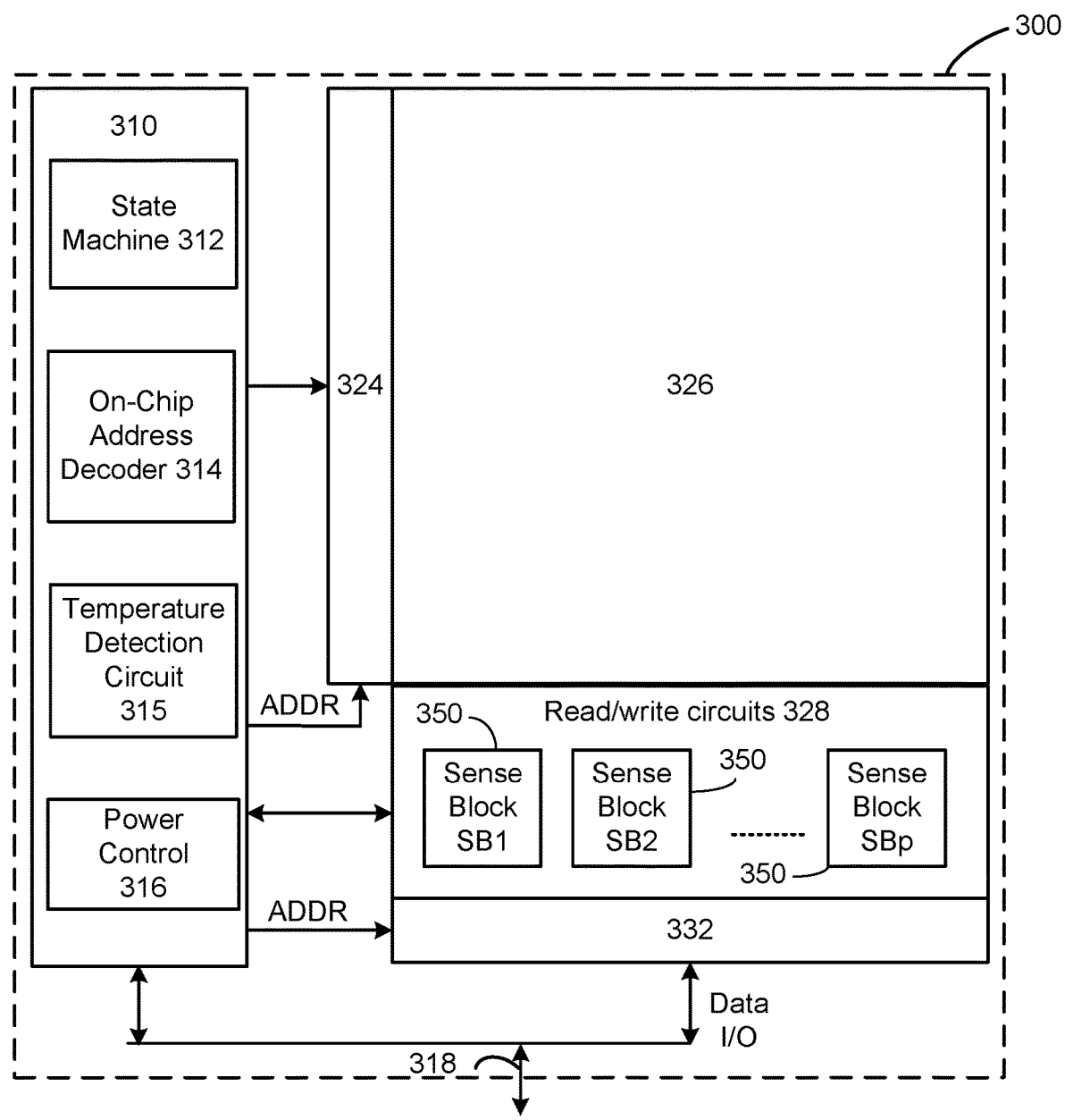
FIG. 2 is a block diagram of one embodiment of a memory die.

FIG. 2 is a functional block diagram of one embodiment of a memory die 300. Each of the one or more memory die 300 of FIG. 1D can be implemented as memory die 300 of FIG. 2. The components depicted in FIG. 2 are electrical circuits. In one embodiment, each memory die 300 includes a memory structure 326, control circuitry 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page (or multiple pages) of data in multiple memory cells to be read or programmed in parallel. In one embodiment, each sense block include a sense amplifier and a set of latches connected to the bit line. The latches store data to be written and/or data that has been read. The sense blocks include bit line drivers.

Commands and data are transferred between the controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, erase, and others) on memory structure 326. In one embodiment, control circuitry 310 includes a state machine 312, an on-chip address decoder 314, a power control circuit 316, and a temperature detection circuit 315. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuitry 310 includes buffers such as registers, ROM fuses and other storage devices for storing default values such as base voltages and other parameters.

The temperature detection circuit 315 is configured to measure temperature on the memory die 300. The memory die 300 reports temperature information to the memory controller 102. In some embodiments, the memory controller 102 is configured to regulate the temperature of the storage device 100. Operating the storage device 100 at a temperature above a critical temperature may result in failure of the storage device 100 to retain data or otherwise operate properly. Therefore, to prevent that from happening, in embodiments that monitor temperature of the storage device 100, or monitor temperature of one or more portions or components of the storage device 100 (e.g., using temperature detection circuit 315 on memory dies 300), a threshold temperature that is below the critical temperature is used as threshold temperature. In some embodiments that measure temperature at more than one location within the storage device, e.g., by measuring temperature of two or more memory die 300, the highest measured temperature of the two or more portions or components of the storage device is used as the measured temperature. In some other embodiments, an average or other combination of the measured temperatures of the two or more portions or components of the storage device 100 is used as the measured temperature.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages.

For purposes of this document, control circuitry 310, alone or in combination with read/write circuits 328 and decoders 324/332, comprise one or more control circuits for memory structure 326. These one or more control circuits are electrical circuits that perform the functions described below in the flow charts and signal diagrams. In other embodiments, the one or more control circuits can consist only of controller 102, which is an electrical circuit in combination with software, that performs the functions described below in the flow charts and signal diagrams. In another alternative, the one or more control circuits comprise controller 102 and control circuitry 310 performing the functions described below in the flow charts and signal diagrams. In another embodiment, the one or more control circuits comprise state machine 312 (or a microcontroller or microprocessor) alone or in combination with controller 102.

In one embodiment, memory structure 326 comprises a monolithic three dimensional memory array of non-volatile memory cells in which multiple memory levels are formed above a single substrate, such as a wafer. The memory structure may comprise any type of non-volatile memory that is monolithically formed in one or more physical levels of arrays of memory cells having an active area disposed above a silicon (or other type of) substrate. In one example, the non-volatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory cell technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
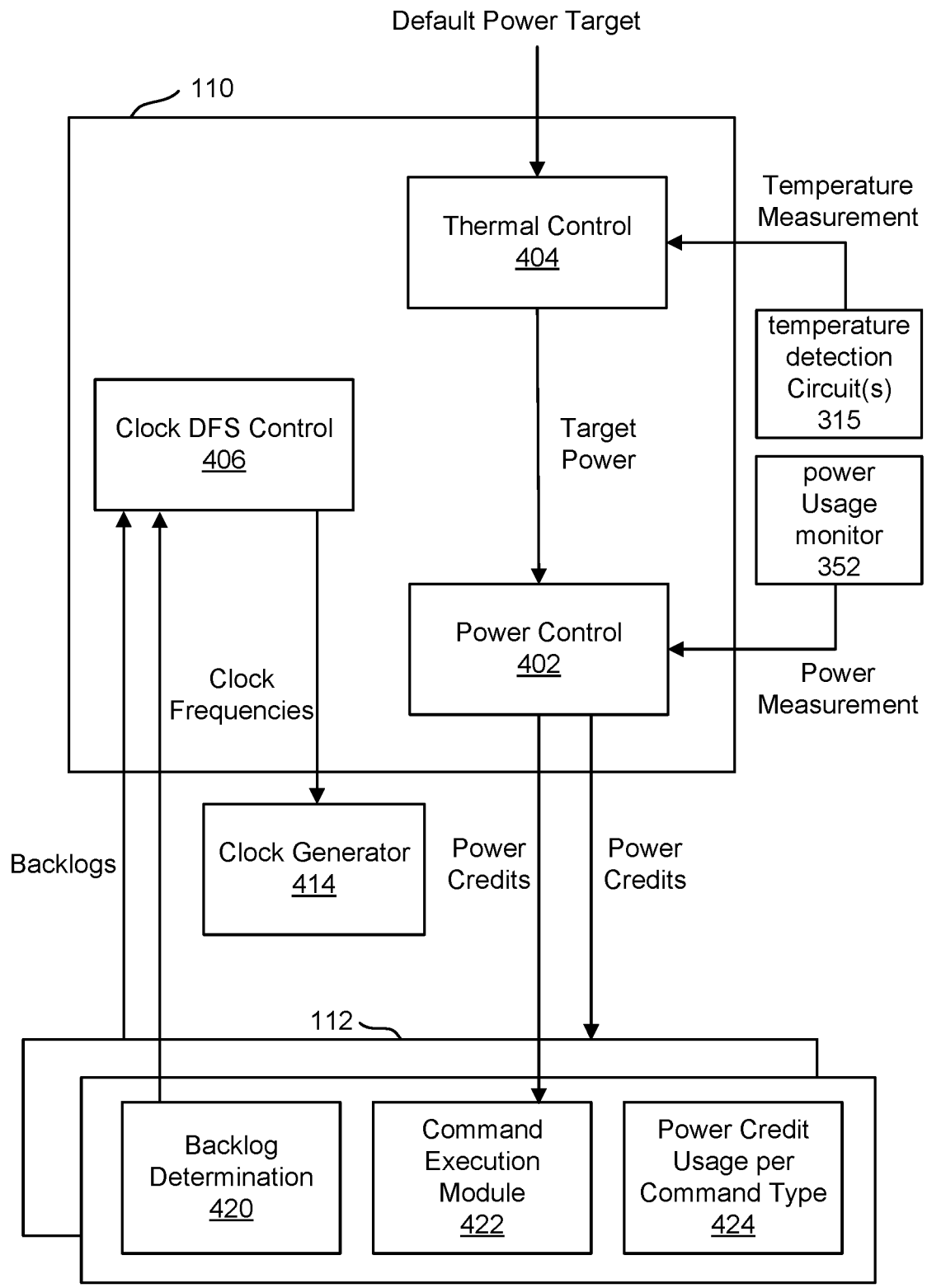
FIG. 3 is a diagram of one embodiment of a memory controller, showing aspects of an integrated solution for controlling power usage, operating temperature, and clock frequencies.

FIG. 3 is a diagram of one embodiment of a memory controller 102, showing aspects of an integrated solution for controlling power usage, operating temperature, and clock frequencies. There are three main control blocks, in one embodiment. The power control block 402 controls (or regulates) power usage of the storage device 100. The thermal control block 404 controls (or regulates) operating temperature of the storage device 100. The clock dynamic frequency scaling (DFS) control block 406 controls (or regulates) clock frequencies of various clocked circuitry, such as processors. The DFS control block 406 may also be referred to as a clock frequency control block. Each of these three blocks includes a closed control loop, in one embodiment. The operation of each control block impacts the other two, in some embodiments.

The thermal control block 404 (also referred to as a temperature control block) receives one or more temperature measurements from one or more temperature detection circuits 315. In some embodiments, each memory die 300 has its own temperature detection circuit 315. In some embodiments, each memory package 104 reports one or more temperatures to the thermal control block 404. For example, a memory package 104 could report a temperature for each memory die 300, the highest temperature of any memory die 300, an average temperature of its memory die 300, etc. The storage device 100 may also have one or more temperature detection circuits 315 outside of the memory packages 104. For example, the FEP 110 and/or BEP 112 could have a temperature detection circuit 315.

Based on the one or more temperature measurements, the thermal control block 404 may take action to reduce the operating temperature. For example, if the highest reported temperature is above a threshold, then the thermal control block 404 takes an action to reduce operating temperature. Otherwise, the thermal control block 404 does not take an action. In one embodiment, the thermal control block 404 inputs a default target power. The default target power is a maximum allowed power, in one embodiment. The default is supplied by the user, in one embodiment. The thermal control block 404 outputs a target power level to the power control block 402. If the thermal control block 404 is not taking any action to reduce the operating temperature, then the thermal control block 404 simply passes through the default target power, in an embodiment. If the thermal control block 404 is taking action to reduce the operating temperature, then the target power level that is output by the thermal control block 404 is lower than the default target power, in an embodiment. A consequence is that the power control block 402 will regulate power usage to this lower level, which will reduce operating temperature.

The power control block 402 inputs a power measurement from the power usage monitor 352. The power usage monitor 352 typically provides an aggregate power usage for the storage device 100. This might be an average power usage over a recent interval, a peak power usage, etc. Optionally, the power usage monitor 352 could provide power usage information for components within the storage device, such as power usage of each memory package 104. In one embodiment, the power control block 402 regulates power usage to operate the storage device 100 at the target power level, providing that there is a sufficient workload (e.g., memory operations) to justify the power usage. In the event that the workload is lower (such that operating at the target power level is not needed to satisfy the workload), it is not required that the storage device 100 operate at the target power level (in this case the storage device 100 may operate below the target power level).

The power control block 402 outputs power credits in order to regulate power usage, in an embodiment. The term "power credit," as defined herein, is a right to use an amount of power specified by the power credit. In some embodiments, the power control block 402 manages the size of a power credit pool. For example, the power control block 402 may add more power credits to the pool in response to the target power increasing, or remove power credits from the pool in response to the target power decreasing. The number of power credits in the pool tends to remain fairly steady under heavy loading due to the fact that the amount of active power remains mostly constant, in an embodiment. However, during idle, the size of the credit pool may tend to drift higher, since the power is below the limit. This upward drift can be limited by inhibiting increases to the pool when idle. The idle, or almost idle condition can be detected from the usage of power credits. In idle, no credits are being used.

In an embodiment, the power control block 402 allocates power credits individually to each BEP 112. In an embodiment, the power control block 402 allocates power credits individually to processors within each BEP 112. For example, with reference to FIG. 1C, the power control block 402 may allocate power credits individually to processor 220 and to processor 250. Each processor 220, 250 may determine how to allocate the power credits among the memory packages under control of the processor. For example, processor 220 may determine how to allocate its power credits to packages connected to interface 228, whereas processor 250 may determine how to allocate its power credits to packages connected to interface 258.

The power credits could be divided equally among the BEP 112, but that is not a requirement. A power credit may correspond to a certain amount of power that may be used to perform a memory operation. When a BEP 112 and its associated memory package 104 are allocated certain amount of power credits, the BEP 112 and memory package 104 can use an amount of power corresponding to the allocated power credits, for example, to execute memory commands. In some embodiments, the schedulers (see interfaces 228, 258) determine when to send commands to the packages based on whether there are sufficient power credits. By slowing down the rate at which commands are executed in the memory packages 104, power consumption can be reduced. However, this may come at the expense of a command backlog. The BEPs 112 each tabulate a command backlog (also referred to as "backpressure") and report that to the FEP 110.

The power credits usage per command type information 424 in a BEP 112 indicates how many power credits are needed to perform certain types of memory operations, in an embodiment. In some embodiments, power credits usage per command type information 424 stores information based on different command types (e.g., read commands, write commands, erase commands). In some embodiments, the information stored for each type of command includes an average power credit value and a peak power credit value. For example, in some embodiments, power credits usage per command type information 424 includes a table having information (e.g., in a record) for each of a several command types. In some embodiments, the table includes a single power credit usage value (e.g., "average" power credit usage) for each command type, while in other embodiments the table includes two distinct power credit usage values (e.g., average power credit usage, and peak power credit usage) for each command type. In some embodiments, each type of command is assigned a different number of power credits.

The command execution module 422 in a BEP 112 is configured to determine when to send commands to a memory package based on the number of power credits allocated to either the BEP 112 or the memory package, as well as the power credits usage per command type information 424. For example, with reference to FIG. 1C, interfaces 228/258 may contain one or more command queues. These command queues may contain read, write, and erase commands, for example. The interfaces 228/258 may determine when to send queued commands to the memory packages 104 based on allocated power credits and power credits usage per command type information 424. For example, the interfaces 228/258 may delay the sending of commands to the memory packages 104 until there are sufficient power credits in view of the power credits usage per command type information 424. The BEP 112 maintains one or more power credit pools, in an embodiment. Power credits are added to the one or more power credit pools as they are received from the FEP 110, in one embodiment. Power credits are removed from the one or more power credit pools, as commands are sent to a memory package 104, in an embodiment.

In one embodiment, the BEP 112 essentially "borrows" the power credits in order to execute memory operations in the packages 104. For example, the command execution module 422 removes a sufficient number of power credits from a credit pool when a command (e.g., read, write, erase) is sent to a memory package 104. When the command completes, the command execution module 422 returns the power credits to the credit pool, in an embodiment.

The backlog determination module 420 in a BEP 112 determines a backlog of commands in that BEP 112. The backlog determination module 420 determines the backlog based on commands that are on command queues waiting to be sent to a memory package 104. For example, the interfaces 228/258 may have commands waiting to be sent to a memory package 104. The backlog determination module 420 may determine a backlog for each memory package 104, an average backlog for the memory package 104 attached to a BEP 112, a total backlog for the BEP 112, etc. For example, with respect to FIG. 1C, interface 228 shows four channels (each channel associated with a "scheduler", a "buffer" and a "TM interface"). The backlog determination module 420 could determine a backlog for each of these four channels. Likewise, the backlog determination module 420 could determine a backlog for each of these four channels connected to interface 258. The backlog determination module 420 may report each of the backlogs, or a composite (e.g., total, average per channel) to the FEP 110.

The clock DFS control 406 inputs the command backlog (or backpressure) from each BEP 112 and determines whether to adjust clock frequencies based on the command backlog, in an embodiment. The DFS block 406 may use inputs other than command backlog as a feedback. In another embodiment, the DFS block 406 inputs a size of the power credit pool as a feedback measurement.

The clock DFS control 406 outputs one or more signals to a clock generator 414, which either generates or regulates a clock signal (or "clock") having a target frequency. A clock signal, as the term is defined herein, is a signal that oscillates between a high and low state. While many clock signals have a 50% duty cycle, a clock signal is not required to have a 50% duty cycle. Various techniques may be used to alter the clock frequencies. Some clock signals have pulses that occur at regular intervals, but the pulses are not required to occur at regular intervals. In one embodiment, a clock frequency can be decreased by suppressing some of the clock pulses (in which case the pulses do not necessarily occur a regular intervals). For example, by suppressing every third clock pulse, the clock frequency can be decreased. In one embodiment, the clock generator has a sporachronous clock generator, which is able to alter a clock frequency by suppressing certain clock pulses. However, suppressing clock pulses is not required to alter clock frequencies.

The clock frequencies are clock frequencies of clocked circuitry, such as one or more processors in the storage device 100. The term "clocked circuitry," as used herein, refers to any electrical circuitry that uses a clock signal to coordinate activity. As noted above, a processor (e.g., microprocessor) is one example of clocked circuitry. Other circuitry, such as a state machine, may use a clock signal to coordinate activity. The clock signals are used by one or more processors in the FEP 110 and one or more processors in the BEP 112, in one embodiment. For example, the clock frequency of memory processor 158 and/or host processor 152 may be set by the clock DFS control 406. Note that the functionality of the memory processor 158, host processor 152, and other components in the FEP 110 could be implemented on the same processor, whose clock frequency is controlled by the clock DFS control 406, in an embodiment. The clock DFS control 406 may also control the clock frequency of processors 220, 250 in BEP 112. Note that the functionality of the processors 220, 250, and other components in the BEP 112 could be implemented on the same processor, whose clock frequency is controlled by the clock DFS control 406, in an embodiment.

In some embodiments, the bandwidths of the three control loops (associated with the three control blocks 402, 404, 406) are different from each other to maintain stability. In one embodiment, the power control loop is the fastest of the three control loops (i.e., has the largest bandwidth), and the thermal control loop is the slowest of the three control loops (i.e., has the least bandwidth).

In some embodiments, the control blocks 402, 404, 406 have different update rates. The update rate refers to the rate at which a control block outputs a new (updated) control signal. In one embodiment, the power control loop has the fastest update rate of the three control loops, and the thermal control loop has the slowest update rate of the three control loops. In one embodiment, the update rate of the thermal control block 404 is about 2.5 seconds, the update rate of the DFS control block is about 500 milliseconds (ms), and the update rate of the power control block 402 is about 100 ms.

The update rate of each control block could be faster or slower. This value of the update rate may be dependent on how long it takes for changes in the control output to be reflected in the measurement feedback. In one embodiment, the update period is established by measuring or estimating how long it takes for a large change in the control output to be realized in the measurement feedback. The update period is set at about two times that time, in an embodiment.

Figure 4:
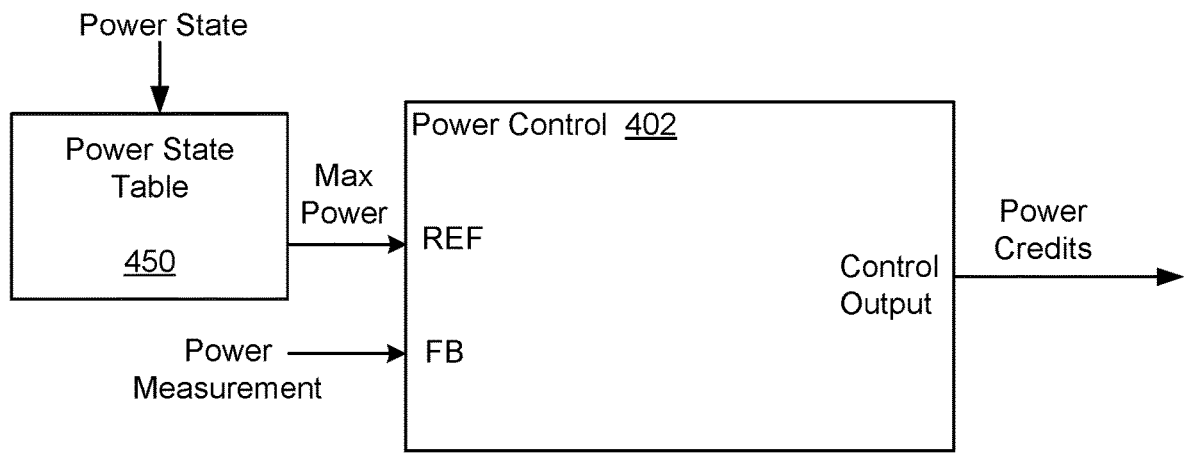
FIG. 4 depicts further details of one embodiment of a power control block.

FIG. 4 depicts further details of one embodiment of power control block 402. The power control block 402 has a reference (REF) input and a feedback (FB) input, as well as a control output. The power state table 450 specifies a maximum allowed power usage for a set of power states, in an embodiment. In one embodiment, the user is allowed to specify the power state. For example, the host system 120 sends the power state to the memory controller 102, in an embodiment. The "Max Power" that is input from the power state table 450 to the REF input refers to a maximum power that the storage device 100 is allowed to consume, in an embodiment. This could be a maximum peak power, a maximum average power over some time period, etc.

The feedback (FB) input receives a feedback signal (e.g., power measurement) from, for example, power usage monitor 352. The power control block 402 issues power credits in order to control the power usage of the storage device 100. The control action is to increase or decrease the size of the credit pool to correct the error between the measured power (at the FB input) and the target power (at the REF input), in an embodiment. The power control block 402 implements a control loop, in an embodiment. The control loop is referred to as a power control loop, in an embodiment. The control loop is a closed control loop, in an embodiment. Further details of controlling power usage in a non-volatile storage device based on allocation of power credits are described in U.S. Published Patent Application 2018/0335977, entitled "Distributed Power Management for Non-Volatile Memory Controllers" by Tidwell et al., published on Nov. 22, 2018; and U.S. Published Patent Application 2018/0335978, entitled "Distributed Power Management for Non-Volatile Memory Controllers using Average and Peak Power Credits Allocated to Memory Channels" by Tidwell et al., published on Nov. 22, 2018; both said Patent Applications are hereby incorporated by reference for all purposes.

Figure 5:
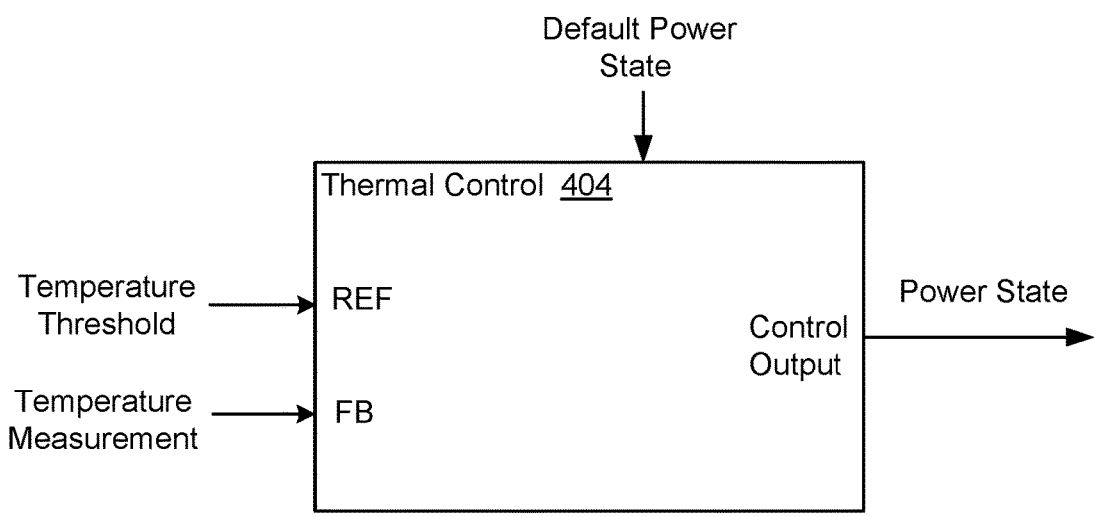
FIG. 5 depicts further details of one embodiment of a thermal control block.

FIG. 5 depicts further details of one embodiment of thermal control block 404. The thermal control block 404 has a reference (REF) input and a feedback (FB) input, as well as a control output. The feedback (FB) input receives a feedback signal (e.g., temperature measurement) from, for example, one or more temperature detection circuits 315. In one embodiment, the feedback (FB) input receives a single value that represents the temperature measurements from multiple temperature detection circuits 315 within the storage device 100. This may be, for example, a peak temperature, an average temperature, etc. The thermal control block 404 outputs a power state in order to control the operating temperature of the storage device 100. The control action is to increase or decrease the power state to correct the error between the measured temperature (at the FB input) and the temperature target (at the REF input), in an embodiment. The power state that is output from thermal control block 404 is used as the power state input to the power state table 450 (see FIG. 4), in an embodiment. Thus, the thermal control block 404 regulates temperature by regulating power usage, in an embodiment.

In one embodiment, when the temperature threshold at the REF input is exceeded, the thermal control block 404 outputs a lower power state to the power control block 402. The host system 120 selected power state is the nominal power state, and is output from the thermal control block 404 when thermal throttling is not in effect. The power control block 402 responds by reducing the size of the credit pool, thus reducing system power which results in lower temperature, in an embodiment. The thermal control block 404 implements a control loop, in an embodiment. The control loop is referred to as a thermal control loop, in an embodiment. The control loop is a closed control loop, in an embodiment. In one embodiment, the closed control loop of the power control block 402 is nested within the closed control loop of the thermal control block 404. The thermal control loop has less bandwidth than the power control loop order to maintain stability, in one embodiment.

Figure 6:
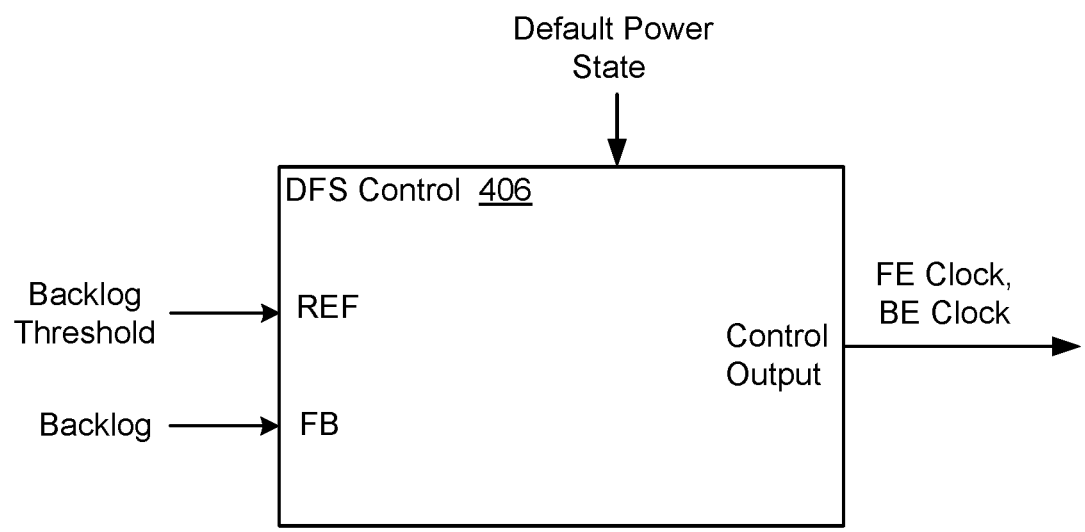
FIG. 6 depicts further details of one embodiment of a DFS control block.

FIG. 6 depicts further details of one embodiment of DFS control block 406. The DFS control block 406 has a reference (REF) input and a feedback (FB) input, as well as a control output. The feedback (FB) input receives a feedback signal (e.g., one or more backlog measurements) from, for example, BEPs 112. The feedback signal of the DFS block 406 is not required to be command backlog as a feedback. In another embodiment, the feedback signal at the FB input is a size of the power credit pool.

The DFS control block 406 outputs one or more front end (FE) clock frequencies and one or more back end (BE) clock frequencies, in an embodiment. For example, the frequency of memory processor 158 and/or host processor 152 may be set by the clock DFS control 406. Note that the functionality of the memory processor 158, host processor 152, and other components in the FEP 110 could be implemented on the same processor, whose frequency is controlled by the clock DFS control 406, in an embodiment. The clock DFS control 406 may also control clock frequency of processors 220, 250 in BEP 112. Note that the functionality of the processors 220, 250, and other components in the BEP 112 could be implemented on the same processor, whose frequency is controlled by the clock DFS control 406, in an embodiment.

The control action is to increase or decrease the clock frequencies to correct the error between the backlog (at the FB input) and the backlog threshold (at the REF input), in an embodiment. The output of the DFS control 406 is sent to a clock generator 414 in the storage device 100, in one embodiment. Various techniques may be used to alter the clock frequencies. In one embodiment, a clock frequency can be decreased by suppressing clock pulses. For example, by suppressing every third clock pulse, the clock frequency can be decreased. In one embodiment, the storage device 100 has a sporachronous clock generator, which is able to alter a clock frequency by suppressing certain clock pulses. However, suppressing clock pulses is not required to alter clock frequencies.

The DFS control block 406 implements a control loop, in an embodiment. The control loop is referred to as a DFS control loop, in an embodiment. The control loop is a closed control loop, in an embodiment. If the command backlog exceeds a backlog threshold, the clock frequencies are reduced, in an embodiment. Reduction of the clock frequencies saves power, which is reclaimed to reduce the performance degradation due to command throttling. If the command backlog does not exceed the backlog threshold, the clock frequencies may be increased in order to allow the FEP 110 and BEP 112 to perform more command processing. In one embodiment, the processors in the FEP 110 and/or BEP 112 are run just fast enough to not be a bottleneck. Further details of controlling command backlog in a non-volatile storage device based on clock frequencies are described in U.S. Published Patent Application 2019/

0094938, entitled "Reactive Power Management for Non-Volatile Memory Controllers" by Tidwell et al., published on Mar. 28, 2019; said Patent Application is hereby incorporated by reference for all purposes.

FIG. 7 is a flowchart of one embodiment of a process 700 of operating a non-volatile storage device 100. The non-volatile storage device 100 has non-volatile memory cells, which may be in a memory structure 326 on a memory die 300. In one embodiment, process 700 is executed by the controller 102 depicted in FIG. 3; however, process 700 is not limited to that architecture.

Step 702 includes operating clocked circuity to process commands to access non-volatile memory cells in the storage device 100. The memory cells are in memory package 104, in an embodiment. The clocked circuity may include one or more processors. The one or more processors are in the FEP 110 and/or one or more BEP 112, in an embodiment. There are one or more processors in the FEP 110 in order to implement at least some of the functionality of the FEP 110, in an embodiment. There are one or more processors in each of one or more BEP 112 in order to implement at least some of functionality of the BEP 112, in an embodiment.

Step 704 includes regulating power usage in the non-volatile storage device 100 based on a target power level while operating the one or more processors. Step 704 includes the power control block 402 regulating power usage, in an embodiment. In one embodiment, the power control block 402 has a FB input that receives a power measurement from power usage monitor 352. The power control block 402 limits the power usage to a target power that is received as a feedback signal at the REF input (see FIG. 4), in an embodiment. Step 704 includes issuing power credits (by, for example, the power control block 402) in order to regulate the power usage, in an embodiment. Step 704 includes delaying processing of commands in response to insufficient power credits, in one embodiment.

Step 706 includes limiting operating temperature of the non-volatile storage device 100 to below a threshold temperature while operating the one or more processors. Step 706 includes the temperature control block 404 regulating the operating temperature, in an embodiment. Step 706 includes establishing the target power level in order to limit the operating temperature of the non-volatile storage device 100 to below the threshold temperature. The target power level is input as a reference signal to the power control block 402 which not only regulates power, but has the net impact of limiting the operating temperature of the non-volatile storage device 100.

Step 708 includes controlling one or more clock frequencies of the one or more processors in response to a backlog of the commands. In one embodiment, the one or more clock frequencies are reduced in response to an increase in the backlog. As will be discussed below, the reduction in clock frequency saves power, which is reclaimed to reduce the command backlog, in an embodiment. Step 708 includes the DFS control block 406 controlling the one or more clock frequencies, in an embodiment.

In some embodiments of process 700, in order to maintain stability, closed control loops for performing power regulation in step 704, thermal regulation in step 706, and DFS regulation in step 708 have different bandwidths. In one embodiment, a power control loop has a larger bandwidth than a DFS control loop, and both the power control loop and the DFS control loops have larger bandwidths than a thermal control loop.

In some embodiment, the response of the control loops (e.g., power, temperature DFS) is specified by a set of parameters that can be set and changed according to simple rules of thumb in order to tune the response based on measured performance. One embodiment of these parameters are shown the table 800 shown in FIG. 8. The top row of the table 800 lists three control types (power, temperature, and DFS). These correspond to the power control block 402, thermal control block 404, and DFS control block 406, in one embodiment. The second row indicates a measurement input of one embodiment of each of the control types. The third row indicates a control output of one embodiment of each of the control types. The discussion above in connection with FIGS. 3-6 has provided some details of the control types, measurement inputs, and control outputs.

The row labeled, "open/closed loop" indicates that in some embodiments, the power control may be either open loop or closed loop, and the DFS control may be either open loop or closed loop. The "control limit max" is the maximum value that the control output can take. For power, a field of the power state table 450 provides this value. The row labeled "control limit max" indicates that the thermal control block 404 inputs the user-specified power state, which the thermal control block 404 may decrease but not increase, in an embodiment. For DFS, the control limit max are the maximum clock frequencies in the FEP 110 and BEP 112.

The "control limit min" is the minimum value that the control output can take. For power, this represents the minimum number of power credits for the memory packages 104 to remain operational. For thermal, this is the lowest operational power state (which is listed in the power state table 450). For DFS this is the minimum clock frequencies for which the FEP 110 and BEP 112 remain operational.

The "target" is the convergence target for the measurement input. There may be other parameters (not shown in the table) such as a "sample period," which is the period of sampling of the measured inputs. Another possible parameter is an "update period," which is the period of updating the control output. Another possible parameter is a "step size", which is the increment in the control output. In one embodiment, the step size may be derived by estimating or measuring the required change in the control output to halt (e.g., keep steady) the highest slope change in the measurement feedback. Then, that change may be divided by, for example, four to use as the step size. In other words, the step size may be selected to insure that any change in the controlled element can be halted in four steps or less. Four steps or less is one example, a different number of steps could be used. Another possible parameter is a "filter factor," which specifies the number of most recent measurement samples to be averaged for feedback to the controller. The filter factor may be used when, for example, a sensor produces more samples than are needed for the feedback for the controller.

The last five rows in the table 800 pertain to zone-specific parameters. The "up correction" means the correction (if any) that is applied when the measured value (e.g., power, temperature, command backlog) is getting larger. The "down correction" means the correction (if any) that is applied when the measured value is getting smaller. Note that both up correction and down correction may be disabled. The determination of whether the measured value is going up or down is done by comparing it with the measurement at the previous correction time, in an embodiment. Having different values for upward and downward correction allows the response to be made more aggressive in one direction over the other, and facilitates correction based on the differential or slope of the feedback measurement. For example, for stability of thermal control, it may be beneficial to step to lower power only when the temperature is increasing, which has a stabilizing effect on the correction. Note that table 800 shows only one zone for compactness. There may be three or more zones, in some embodiments. The zone-specific parameters will be discussed in more detail with respect to FIGS. 9 and 10.

FIG. 9 is a diagram that illustrates an embodiment of correction steps based on an error trend. Curve 902 represents the value of a feedback measurement (e.g., power, temperature) over time. Thus, the vertical axis is labeled as "Watts/Degrees Celsius" to indicate that the axis represents Watts or, alternatively, degrees Celsius, depending on whether power or temperature is being measured. The dotted curve 904 represents a possible overshoot of the curve 902. In this embodiment, there are three zones. Zone 2 is referred to as a "dead zone," in which no corrections are made, in one embodiment. In one embodiment, the target is in the middle of the dead zone. However, if there is a hard upper limit to the target (e.g., a critical temperature), then the dead zone may be set such that there is considerable headroom above the target.

The upper and lower bounds of Zone 2 may be defined by a table such as table 800. The upper and lower bounds could be defined as a percentage of the target. For example, the upper and lower bounds of Zone 2 are a percentage of the target temperature, in an embodiment. The upper and lower bounds of Zone 2 are a percentage of the target power, in an embodiment.

Zone 1 is defined as the region below the dead zone, and Zone 3 is defined as the region above the dead zone, in this embodiment. FIG. 9 highlights a portion of curve 902 that is in Zone 3 to emphasize that when the feedback measurement (e.g., power, temperature) is in Zone 3 and trending downward no corrective step is performed, in one embodiment. In this case, the error (e.g., difference between curve 902 and a target in the dead zone) is decreasing. This helps to prevent the feedback measurement (e.g., power, temperature) to not overshoot zone 2 (and end up in zone 1). In contrast, when the feedback measurement (e.g., power, temperature) is in Zone 3 and trending upward a corrective step is performed.

Figure 10:
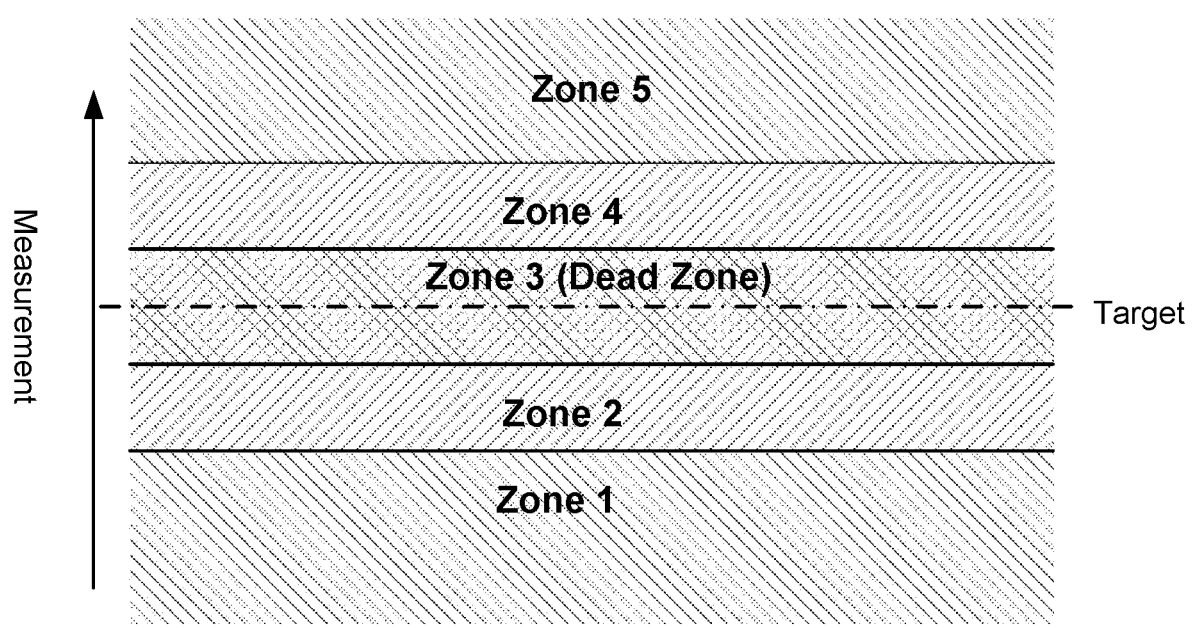
FIG. 10 is a diagram that illustrates an embodiment in which there are five zones.

FIG. 10 is a diagram that illustrates an embodiment in which there are five zones. In this embodiment, a different set of parameters may be used for each of the five zones. Zone 3 is referred to as a "dead zone," in which no corrections are made, in one embodiment. The target is in the middle of Zone 3. The upper and lower bounds of Zone 2 and Zone 4 are defined as a percentage of the target, in one embodiment. Zone 1 is defined as anything below Zone 2, and Zone 5 is defined as anything above Zone 4, in an embodiment. The corrections may be more aggressive in Zone 1 than in Zone 2 in order to help converge to the target faster, while not overshooting the target (or with a minimum of overshoot). Likewise, the corrections may be more aggressive in Zone 5 than in Zone 4 in order to help converge to the target faster, while not overshooting the target (or with a minimum of overshoot).

In some embodiments, correction is based on estimated time of arrival (ETA). ETA refers to the number of correction periods before the measured feedback is estimated to reach the target value. ETA is a method of doing correction based on a trajectory of the error differential relative to a curve. In some embodiments, pre-emptive corrective action is taken based on the ETA relative to an ETA factor. This allows a steep rise, with a fast roll off near the target. This also facilitates fast lock with a "smooth landing," providing control that both reaches the target quickly and has small overshoot. Note that these are characteristics which are a trade off with a conventional control loop. The ETA factor (along with the step sizes) sets the sharpness of the correction curve.

Figure 11:
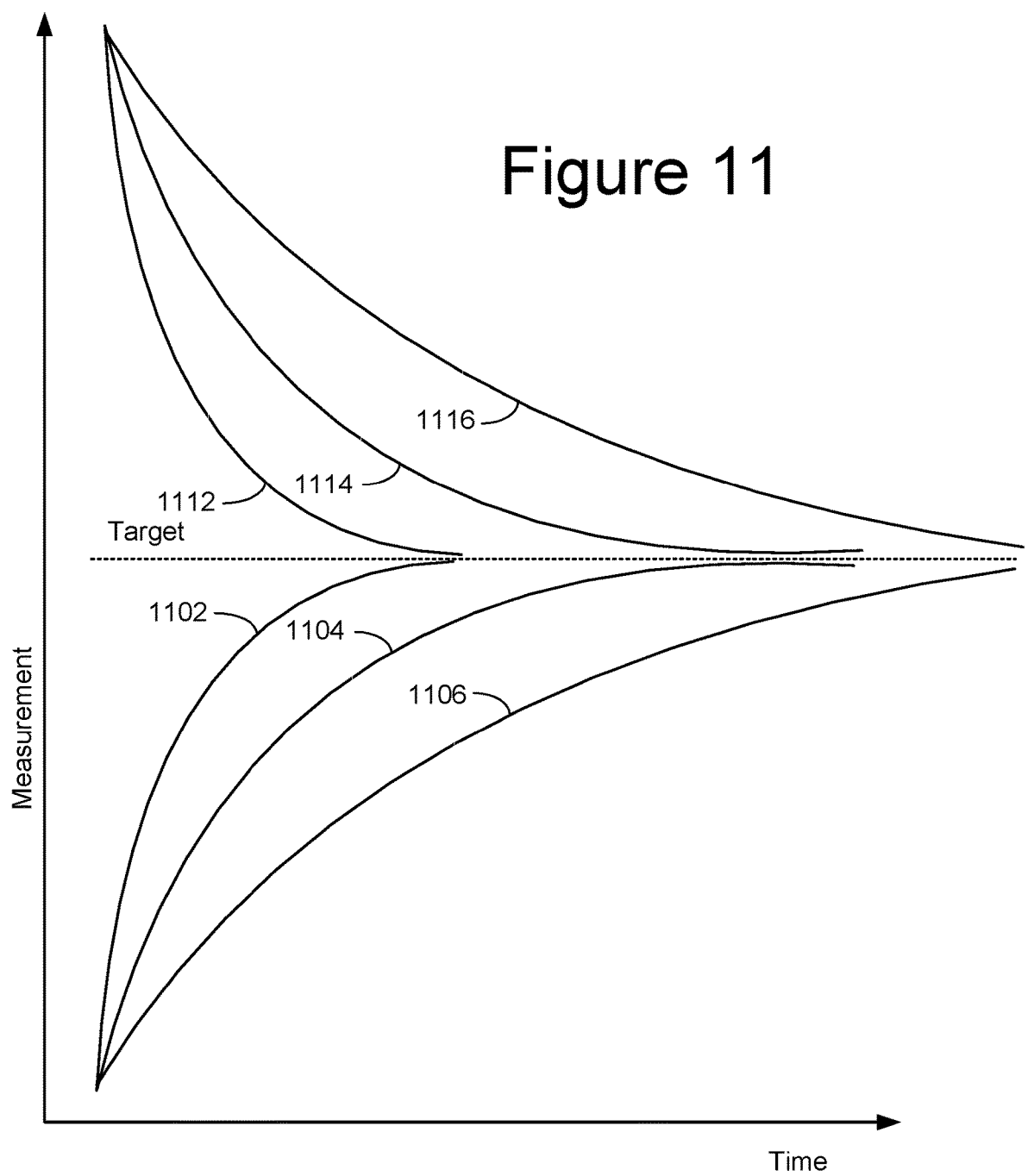
FIG. 11 illustrates a glide path that relates to an embodiment that uses an ETA factor.

FIG. 11 illustrates a glide path that relates to an embodiment that uses an ETA factor to establish the outputs of one or more of the power control block 402, thermal control block 404, and/or DFS control block 406. In one embodiment, a glide path is used in a storage device 100 having a power control loop (e.g., power control block 402), a thermal control loop (e.g., thermal control block 404), and a DFS control loop (e.g., DFS control block 406. However, the glide path may be used in a storage device 100 without all three of these control loops. Even if the storage device 100 has more than one such control loop, the glide path is not required to be used in all control loops. With respect to FIG. 11, the glide path could be used in any combination of the control blocks 402, 404, 406.

Glide paths 1102, 1104, 1106 correspond to three different ETA factors. Note that the slope of these glide paths decreases as the curve gets closer to the target. These three glide paths 1102, 1104, 1106 approach the target from beneath. All three ETA factors are non-zero and positive, in one embodiment. In one embodiment, glide path 1102 has the smallest ETA factor of the three, and glide path 1106 has the largest ETA factor of the three. As noted above, ETA factor is the number of correction periods before the measurement will reach the target. Glide paths 1112, 1114, 1116 correspond to three different ETA factors. These three glide paths 1112, 1114, 1116 approach the target from above. All three ETA factors are non-zero and positive, in one embodiment. In one embodiment, glide path 1112 has the smallest ETA factor of the three, and glide path 1116 has the largest ETA factor of the three.

Figure 12:
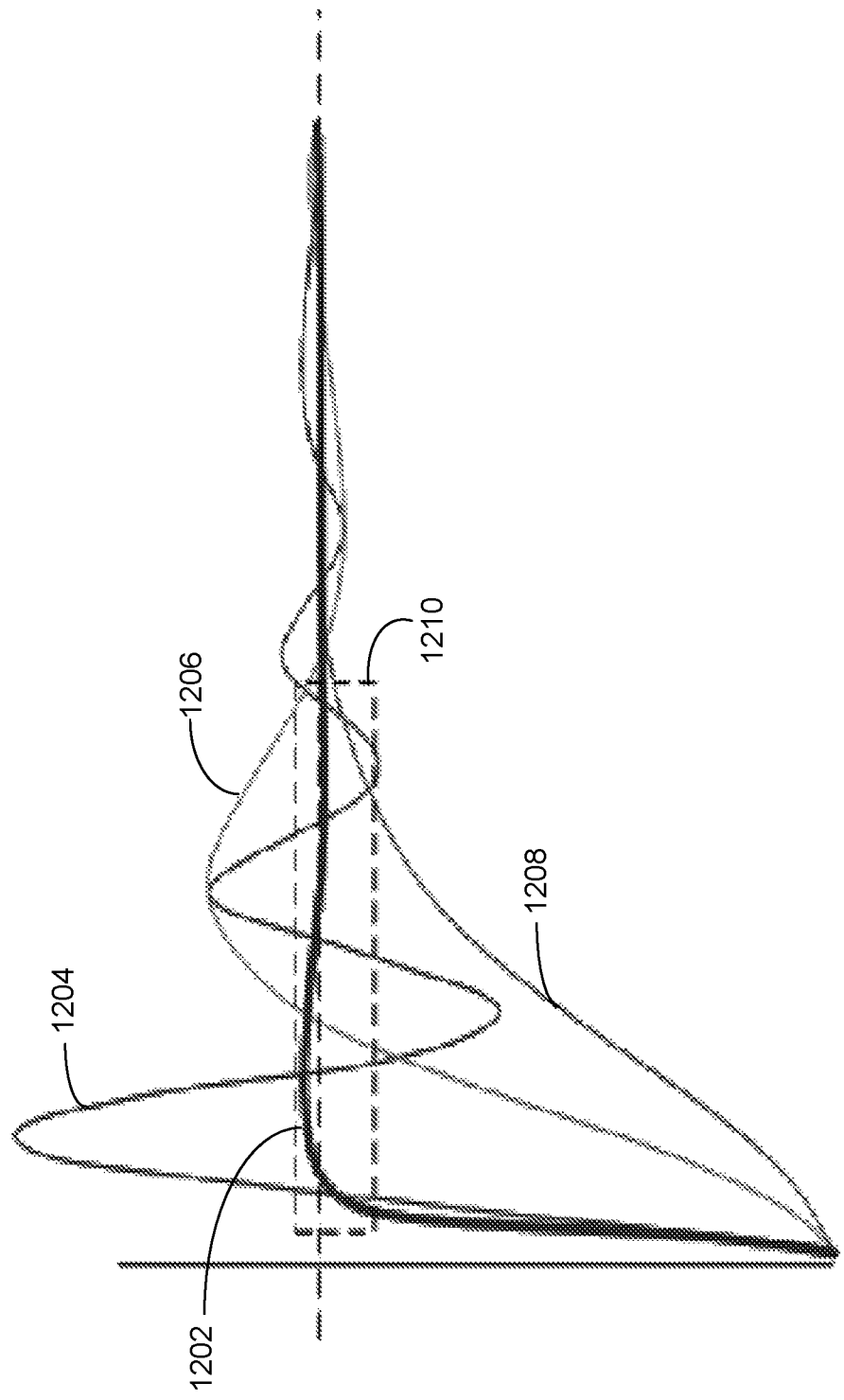
FIG. 12 illustrates how embodiments of using the ETA factor to achieve a glide path compares to some conventional correction responses.

FIG. 12 illustrates how embodiments of using the ETA factor to achieve a glide path compares to some conventional correction responses. Curve 1202 represents one embodiment of a glide path. Curve 1204 represents a conventional highly underdamped response. Curve 1206 represents a conventional underdamped response. Curve 1208 represents a critically damped response.

In one embodiment no correction is applied until the measurement is close to the target, which is represented by the glide path curve 1202 rapidly approaching the target until box 1210 is reached. When the target crossing is imminent, the control kicks in strongly to produce a "soft landing", in an embodiment. This is represented by the substantial change in direction of glide path curve 1202 just before it reaches the target. When the error is small, the control action is limited to stabilize at the target. This is represented by the glide path curve 1202 having a path that closely follows the target after it crosses the target.

Figure 13:
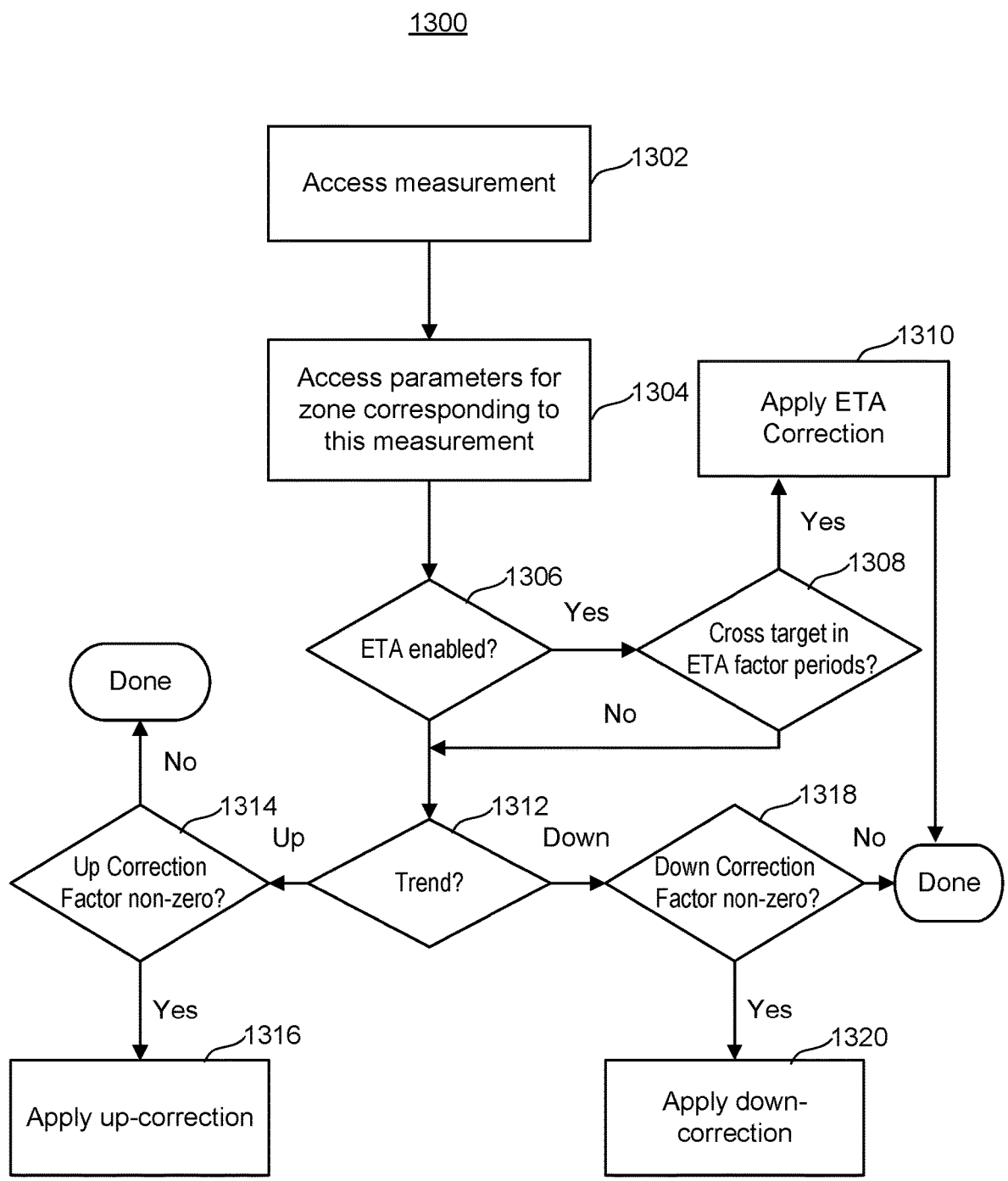
FIG. 13 is flowchart of one embodiment of a process for taking corrective action based on zone-specific parameters.

FIG. 13 is flowchart of one embodiment of a process 1300 for taking corrective action based on zone-specific parameters. The process 1300 is performed by the power control block 402, in one embodiment. The process 1300 is performed by the thermal control block 404, in one embodiment. The process 1300 is performed by the DFS control block 406, in one embodiment. In some embodiments, the power control block 402, the thermal control block 404, and the DFS control block 406 perform the process 1300 in parallel, for their respective control loops. However, it is not required that all three of the control blocks (402, 404, 406) perform process 1300 in parallel.

Note that process 1300 is initiated in response to receiving the latest feedback measurement, in an embodiment. Step 1302 includes accessing the feedback measurement. In one embodiment, the feedback measurement is power usage of the storage device. Power usage monitor 352 may provide the power measurement. In one embodiment, the feedback measurement is an operating temperature of the storage device. One or more temperature detection circuits 315 may provide the temperature measurement. In one embodiment, the feedback measurement is a command backlog of the storage device. One or more BEPs 112 provide the command backlog(s) in an embodiment.

Step 1304 includes accessing parameters for the zone corresponding to this feedback measurement. For example, with respect to FIG. 9, a determination is made as to which of the three zones the measurement fall into. With respect to FIG. 10, a determination is made as to which of the five zones the feedback measurement falls into. A different number of zones could be used other than three or five. The parameters are accessed from a table such as the table 800. Steps 1306-1320 describe correction steps that may be applied. One of the parameters is a step size, in one embodiment. The step size may vary depending on the zone. For example, the step size in zones 1 and 5 may be a full unit, with the step size in zones 2 and 4 being a half unit (with no step in zone 3). In some embodiment, if the error is outside of the dead zone AND increasing in magnitude, a step change is made in the opposite direction. The corrective action taken is function of the error magnitude and the error derivative, in an embodiment. The derivative may be calculated by storing the feedback value for the last time step and subtracting it from the current time step.

Step 1306 is a determination of whether an ETA is enabled. In one embodiment, ETA is enabled if an ETA factor is non-zero. If ETA is enabled, a determination is made in step 1308 of whether a feedback measurement (e.g., temperature, power, command backlog) is estimated to cross the target within an ETA factor number of periods. This estimate is made by determining the current slope of the feedback measurement, and determining how may update periods it will take the measurement to cross the target. As discussed above, the ETA factor is a number of periods. For example, if the ETA factor is four and it is estimated that the feedback measurement to cross the target in four or fewer periods, then pre-emptive correction is performed in step 1310.

The pre-emptive correction, in step 1310, includes taking corrective measures to reduce the slope of the measurement. For example, the pre-emptive correction may result in one of the measurement curves 1102, 1104, 1106, 1112, 1114, 1116 in FIG. 11. Thus, the pre-emptive correction may provide a "soft landing" at the target. The corrective action is function of the error magnitude and the error derivative, in an embodiment. After performing ETA correction, the process ends.

If ETA is not enabled (step 1306=no) or the is not estimated to cross the target within the ETA factor number of periods, then the process takes action on whether the trend is up or down. Note that if ETA is enabled, then ETA is typically performed when the error measurement is lower. Thus, steps 1312-1320 may cover situations in which the error measurement is higher (assuming ETA is enabled).

Step 1312 is a determination of whether the trend in the measurement is up or down. If the trend is up, then a determination is made whether an up correction factor is non-zero, in step 1314. If so, then up-correction is performed in step 1316. Otherwise, the process ends. If the trend is down, then a determination is made whether a down-correction factor is non-zero, in step 1318. If so, then down-correction is performed in step 1320. Otherwise, the process ends. For both the up-correction and the down-correction, the factors may have different non-zero values for different zones, wherein a different of correction may be performed for different zones.

Figure 14:
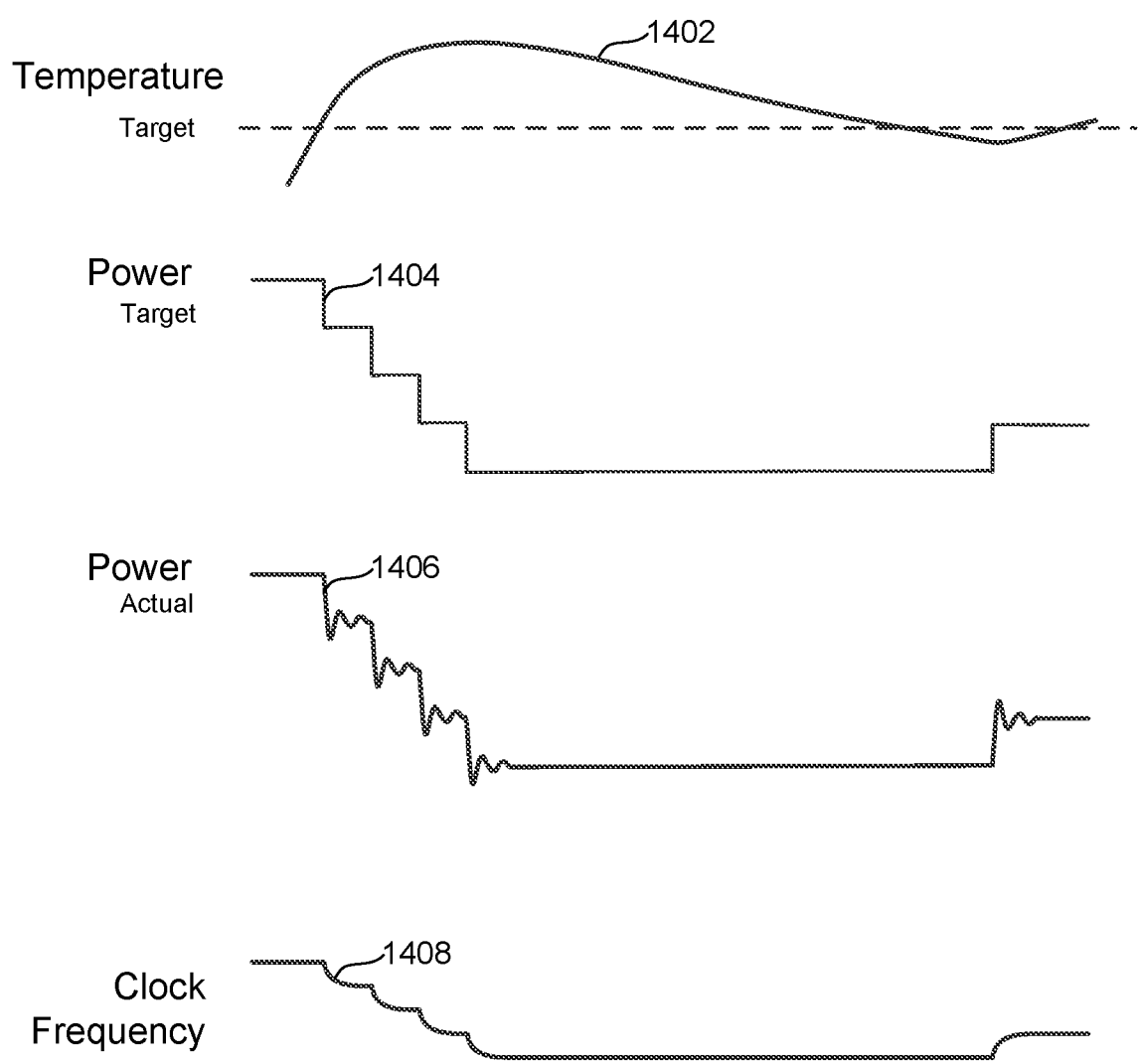
FIG. 14 shows how temperature control, power control and DFS control work together, in one embodiment.

FIG. 14 shows how temperature control, power control and DFS control work together, in one embodiment. FIG. 14 also illustrates the bandwidth differences between the temperature control loop, the power control loop and DFS control loop, in one embodiment. Curve 1402 shows the operating temperature of the storage device 100 over time. The operating temperature is controlled by a temperature control loop, in one embodiment. Curve 1404 shows a target power usage of the storage device 100 over time. Curve 1406 shows actual power usage of the storage device 100 over time. The actual power usage is controlled by a power control loop, in one embodiment. Curve 1408 shows clock frequency over time. The clock is controlled by a DFS control loop, in one embodiment. Curve 1402 indicates that the temperature control loop has the lowest bandwidth of the three control loops, in one embodiment. Curve 1406 indicates that the power control loop has the highest bandwidth of the three control loops, in one embodiment.

Figure 15:
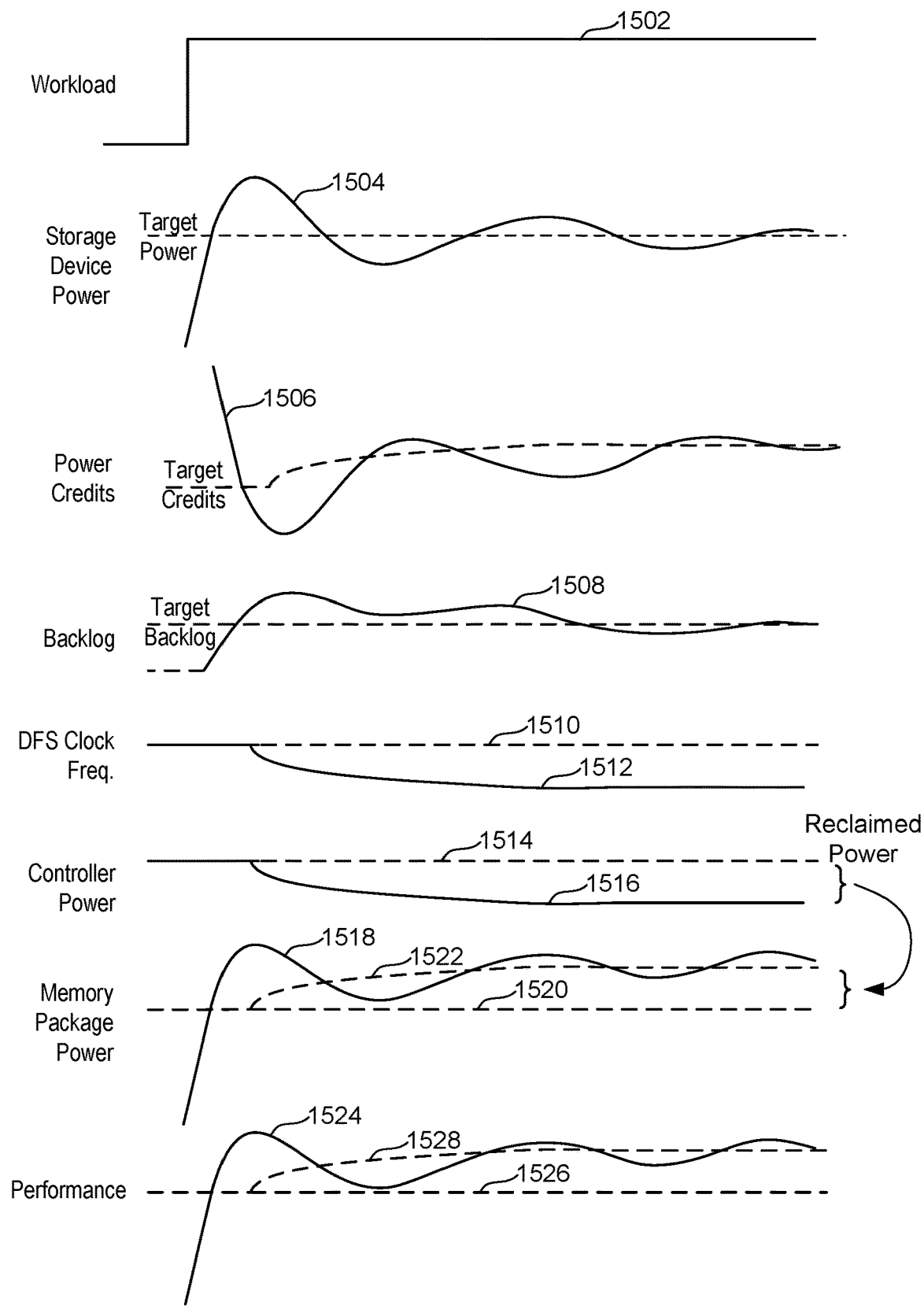
FIG. 15 shows further details of how temperature control, power control and DFS control work together, in one embodiment.

FIG. 15 shows further details of how temperature control, power control and DFS control work together, in one embodiment. Curve 1502 shows a workload over time. Curve 1502 indicates a significant step up in the workload. The other curves indicate how the storage device 100 reacts to the step up in workload. Curve 1504 the power consumption for the storage device 100, relative to a target power level. The target power consumption level is shown in dashed lines. Note that the target power consumption for the storage device does not change during this time period.

Curve 1506 shows how power credits are changed over time by the power control block 402. There is a dashed line labeled target credits. In this example, the power credits initially decrease in response to the added workload. However, the storage device 100 is able to increase the power credits, as will be described below.

Curve 1508 shows how a command backlog changes over time. The command backlog initially increases as a result of the drop in power credits. However, the command backlog decreases and stabilizes at the target level.

Line 1510 shows the initial clock frequency, before the workload increased. Line 1510 is dashed after the increase in workload to indicate that this clock frequency is no longer being used. Curve 1512 depicts a decrease in clock frequency due to actions of the DFS block 406.

Line 1514 depicts the power usage of the memory controller initially, before the increase in the workload. Line 1514 is dashed to indicate that this power usage is hypothetical. Note that curve 1514 represent power usage of the FEP 110 and the BEP 112, but does not include power usage of memory packages 104 (which contain the memory cells being read, written, erased, etc.). Curve 1516 depicts the decreased power usage of the memory controller, which may be attributed to the decreased clock frequency. For example, by running clocked circuity (e.g. one or more processors in the FEP 110, and one or more processors in each BEP 112) at a slower rate, power is saved. The gap between curve 1514 and 1516 represents power saved in the memory controller 102.

Curve 1518 depicts the power usage of the memory packages 104 over time. Curve 1522 represents the target power usage of the memory packages 104. The power usage quickly reaches and stabilizes at the target level. Curve 1520 represents a hypothetical power usage of the memory packages 104 if power credits were not increased. The gap between curve 1520 and 1522 represents additional power used in the memory packages 104. Note that the power that was saved in the memory controller 102 is, in effect, reclaimed, and used in the memory packages 104.

Curve 1524 represent performance over time. Curve 1528 represents a target performance, at which the actual performance quickly stabilizes. Curve 1526 represents a hypothetical performance level if additional power was not allocated to the memory packages 104. Thus, the performance of the storage device 100 may be increased without increasing the overall power consumption of the storage device 100.

FIG. 16 is flowchart of one embodiment of a process 1600 of saving power during idle periods in a non-volatile storage device. The process 1600 may be executed within a storage device having several control loops (e.g., thermal, power, DFS) as in, for example, FIG. 3. However, it is not required that the storage device 100 have several such control loops. In one embodiment, process 1600 is performed in a storage device 100 having a power control block 402, and a DFS block 406.

Step 1602 includes detecting that the storage device 100 is idle. The definition of idle can be set in accordance with how aggressively it is desired that the storage device enter a power saving mode. In one embodiment, step 1602 is based on a backpressure metric, such as a command backlog. In one embodiment, the storage device 100 is considered idle of the there is no command backlog. This may correspond to a situation in which there have not been any memory commands issued to the memory packages 104 for a period of time.

Step 1604 includes setting the frequencies of one or more processors in the storage device 100 to an idle level to save power. This is performed response to a backlog of the commands being below a threshold, in one embodiment. The idle level is a fully functional mode of operation of the non-volatile storage device, in an embodiment. By fully functional it is meant that all of the clocked circuity is able to perform its functions, albeit at a slower pace. Thus, the storage device 100 is not shut down in the idle mode. In one embodiment, the idle clock frequency is about 15% the maximum clock frequency. In some embodiments, step 1604 includes using a sporachronous clock generator, which is able to alter a clock frequency by suppressing certain clock pulses. Thus, step 1604 may include suppressing certain clock pulses. For example, seven out of each eight clock cycles might be suppressed.

Step 1606 includes detection of a user operation. This may include detecting that a host system has sent a memory operating to the memory controller 102.

Step 1608 includes change the clock frequency from the idle level to a full speed level. Step 1608 is performed in response to detection of the user operation. In some embodiments, step 1608 includes the restoration of the suppressed clock cycles. Note that restoring to the full speed level does not require any recovery time, in an embodiment.

A first embodiment includes a non-volatile storage device, comprising non-volatile memory cells, clocked circuitry, and one or more control circuits. The one or more control circuits are configured to process commands to access the non-volatile memory cells using the clocked circuitry. The one or more control circuits are configured to implement a power control loop to regulate power consumption of the non-volatile storage device based on a first feedback signal. The one or more control circuits are configured to implement a temperature control loop to regulate temperature of the non-volatile storage device based on a second feedback signal. The one or more control circuits are configured to implement a clock frequency control loop to regulate one or more clock frequencies of the clocked circuitry based on a third feedback signal.

In a second embodiment, in furtherance to the first embodiment, the power control loop is a closed loop having a first bandwidth, the clock frequency control loop is a closed loop having a second bandwidth that is smaller than the first bandwidth, and the temperature control loop is a closed loop having a third bandwidth that is smaller than the second bandwidth.

In a third embodiment, in furtherance to the first or second embodiments, the power control loop has a target power as a reference input, a measured power as the first feedback signal, and power credits as a control output. Also, the temperature control loop has a measured temperature as the second feedback signal, and the target power as a control output.

In a fourth embodiment, in furtherance to any of the first to third embodiments, the one or more control circuits are further configured to process the commands in response to having a sufficient amount of the power credits. The clock frequency control loop has a command backlog as the third feedback signal, and the one or more clock frequencies as a control output.

In a fifth embodiment, in furtherance to any of the first to fourth embodiments, the one or more control circuits are further configured to process the commands in response to having a sufficient amount of the power credits. The clock frequency control loop has a size of a pool of the power credits as the third feedback signal, and the one or more clock frequencies as a control output.

In a sixth embodiment, in furtherance to any of the first to fifth embodiments, the power control loop has a first update rate, the clock frequency control loop has a second update rate that is slower than the first update rate, and the temperature control loop has a third update rate that is slower than the second update rate.

In a seventh embodiment, in furtherance to any of the first to sixth embodiments, the one or more control circuits are further configured to perform correction for one or more of the power control loop, the temperature control loop or the clock frequency control loop based on an estimated time of arrival (ETA) of when a measurement of the feedback signal for the respective control loop is estimated to reach a target value.

In an eighth embodiment, in furtherance to any of the first to seventh embodiments, the one or more control circuits are further configured to set the one or more clock frequencies to an idle level to save power responsive to a backlog of the commands being below a threshold, wherein the clocked circuity remain fully functional when operating at the idle level.

In a ninth embodiment, in furtherance to the eighth embodiment, the one or more control circuits are further configured to change the one or more clock frequencies from the idle level to a full speed level in response to detection of a user operation with respect to the non-volatile storage device.

An embodiment includes a method of operating a non-volatile storage device comprising non-volatile memory cells. The method comprises operating one or more processors to execute commands to access the non-volatile memory cells. The method comprises regulating power usage in the non-volatile storage device based on a target power level while operating the one or more processors, including issuing power credits to execute the commands. The method comprises limiting operating temperature of the non-volatile storage device to below a threshold temperature, including establishing the target power level. The method comprises reducing a frequency of one or more clock signals of the one or more processors in response to an increase of backlog of the commands.

An embodiment includes a non-volatile storage device, comprising non-volatile memory cells, and a non-volatile memory controller comprising one or more processors. The non-volatile memory controller is configured to process commands to access the non-volatile memory cells using the one or more processors. The non-volatile memory controller is configured to control power usage of the non-volatile storage device using a first closed control loop having a first bandwidth. The non-volatile memory controller is configured to control operating frequencies of the one or more processors using a second closed control loop having a second bandwidth that is less than the first bandwidth. The non-volatile memory controller is configured to control operating temperature of the non-volatile storage device using a third closed control loop having a third bandwidth that is less than the second bandwidth.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile storage device, comprising:
   non-volatile memory cells;
   clocked circuitry; and
   one or more control circuits configured to:
   process commands to access the non-volatile memory cells using the clocked circuitry;
   implement a power control loop to regulate power consumption of the non-volatile storage device based on a first feedback signal, the power control loop having a first update rate;
   implement a clock frequency control loop to regulate one or more clock frequencies of the clocked circuitry based on a second feedback signal, the clock frequency control loop having a second update rate that is slower than the first update rate; and
   implement a temperature control loop to regulate temperature of the non-volatile storage device based on a third feedback signal, the temperature control loop having a third update rate that is slower than the second update rate.

2. The non-volatile storage device of claim 1, wherein:
   the power control loop is a closed loop having a first bandwidth;
   the clock frequency control loop is a closed loop having a second bandwidth that is smaller than the first bandwidth; and
   the temperature control loop is a closed loop having a third bandwidth that is smaller than the second bandwidth.

3. The non-volatile storage device of claim 1, wherein:
   the power control loop has a target power as a reference input, a measured power as the first feedback signal, and power credits as a control output; and
   the temperature control loop has a measured temperature as the third feedback signal, and the target power as a control output.

4. The non-volatile storage device of claim 3, wherein:
   the one or more control circuits are further configured to process the commands in response to having a sufficient amount of the power credits; and
   the clock frequency control loop has a command backlog as the second feedback signal, and the one or more clock frequencies as a control output.

5. The non-volatile storage device of claim 3, wherein:
   the one or more control circuits are further configured to process the commands in response to having a sufficient amount of the power credits; and
   the clock frequency control loop has a size of a pool of the power credits as the second feedback signal, and the one or more clock frequencies as a control output.

6. The non-volatile storage device of claim 1, wherein:
   the one or more control circuits are further configured to perform correction for one or more of the power control loop, the temperature control loop or the clock frequency control loop based on an estimated time of arrival (ETA) of when a measurement of the feedback signal for the respective control loop is estimated to reach a target value.

7. The non-volatile storage device of claim 1, wherein the one or more control circuits are further configured to:
   set the one or more clock frequencies to an idle level to save power responsive to a backlog of the commands being below a threshold, wherein the clocked circuitry remain fully functional when operating at the idle level.

8. The non-volatile storage device of claim 7, wherein the one or more control circuits are further configured to:
   change the one or more clock frequencies from the idle level to a full speed level in response to detection of a user operation with respect to the non-volatile storage device.

9. A method of operating a non-volatile storage device comprising non-volatile memory cells, the method comprising:
   operating one or more processors to execute commands to access the non-volatile memory cells;

regulating power usage in the non-volatile storage device based on a target power level while operating the one or more processors, including issuing power credits to execute the commands;

limiting operating temperature of the non-volatile storage device to below a threshold temperature, including establishing the target power level; and reducing a frequency of one or more clock signals of the one or more processors in response to an increase of backlog of the commands.

10. The method of claim 9, wherein:

regulating the power usage comprises updating the power credits at a first rate;

regulating the frequency of the one or more clock signals comprises updating the one or more clock frequencies at a second rate that is slower than the first rate; and regulating the operating temperature comprises updating the target power level at a third rate that is less than the second rate.

11. The method of claim 9, wherein regulating the power usage comprises:

providing pre-emptive correction based on an estimate of when the power usage will reach a target power, including reducing a slope of the power usage over time to produce a soft landing of the power usage at the target power.

12. The method of claim 9, further comprising:

setting the frequency of the one or more clock signals of the one or more processors to an idle level to save power responsive to a backlog of the commands being below a threshold, including suppressing one or more pulses of the one or more clock signals, wherein the one or more processors remain fully functional when operating at the idle level.

13. The method of claim 12, further comprising:

changing the frequency of the one or more clock signals from the idle level to a full speed level in response to detection of a user operation, including removing the suppression of the one or more pulses of the one or more clock signals.

14. A non-volatile storage device, comprising:

non-volatile memory cells; and a non-volatile memory controller comprising one or more processors, the non-volatile memory controller comprising:

means for processing commands to access the non-volatile memory cells;

means for controlling power usage of the non-volatile storage device using a first closed control loop having a first bandwidth;

means for controlling operating frequencies of the one or more processors using a second closed control loop having a second bandwidth that is less than the first bandwidth; and means for controlling operating temperature of the non-volatile storage device using a third closed control loop having a third bandwidth that is less than the second bandwidth.

15. The non-volatile storage device of claim 14, wherein the non-volatile memory controller is configured to:

control the power usage of the non-volatile storage device based on a user supplied target power level as a default; and control the power usage of the non-volatile storage device based on a target power level that is based on the operating temperature in response to the operating temperature of the non-volatile storage device exceeding a threshold.

16. The non-volatile storage device of claim 14, wherein the non-volatile memory controller is configured to:

delay processing of commands to access the non-volatile memory cells to control the power usage of the non-volatile storage device to a target power level; and reduce the target power level to reduce the operating temperature of the non-volatile storage device.

17. The non-volatile storage device of claim 16, wherein the non-volatile memory controller is configured to:

reduce operating frequencies of one or more processors of the non-volatile storage device in response to a backlog of the commands; and continue to process the commands to access the non-volatile memory cells after reducing the operating frequencies of the one or more processors.

18. The non-volatile storage device of claim 14, wherein the non-volatile memory controller is configured to:

control one of more of the power usage, the operating temperature or the operating frequencies of the one or more processors based on an estimated time of arrival (ETA) of when a feedback measurement will reach a target value.

19. The non-volatile storage device of claim 14, wherein the non-volatile memory controller is configured to:

set the operating frequencies of the one or more processors to an idle level to save power responsive to a backlog of the commands being below a threshold, wherein the idle level is a fully functional mode of operation of the non-volatile storage device; and change the operating frequencies from the idle level to a full speed level in response to detection of a user operation.

* * * * *